March 21, 1939. R. S. DAVIS 2,151,015
MACHINE FOR MAKING EGG BOX FILLERS
Filed April 16, 1937 12 Sheets-Sheet 1
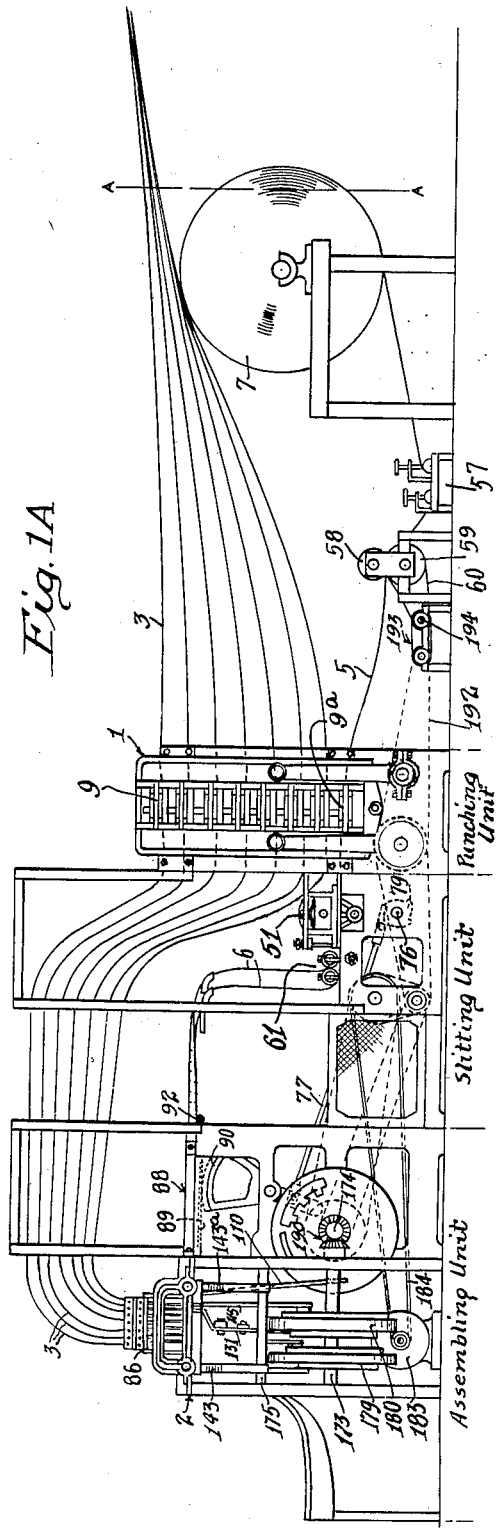
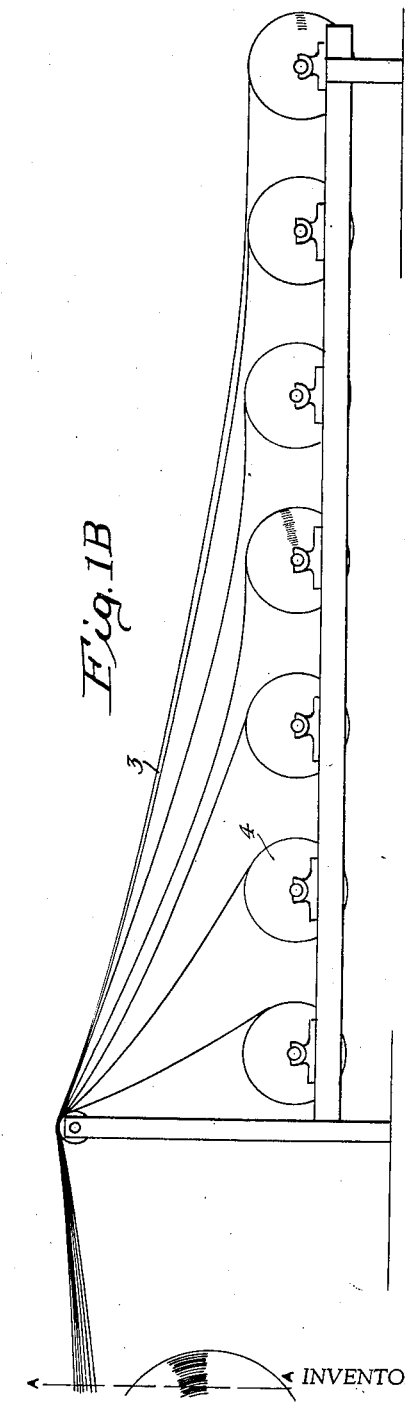
INVENTOR.
Roy S. Davis.
BY Lyon & Lyon
ATTORNEYS March 21, 1939. R. S. DAVIS 2,151,015
MACHINE FOR MAKING EGG BOX FILLERS
Filed April 16, 1937 12 Sheets-Sheet 2
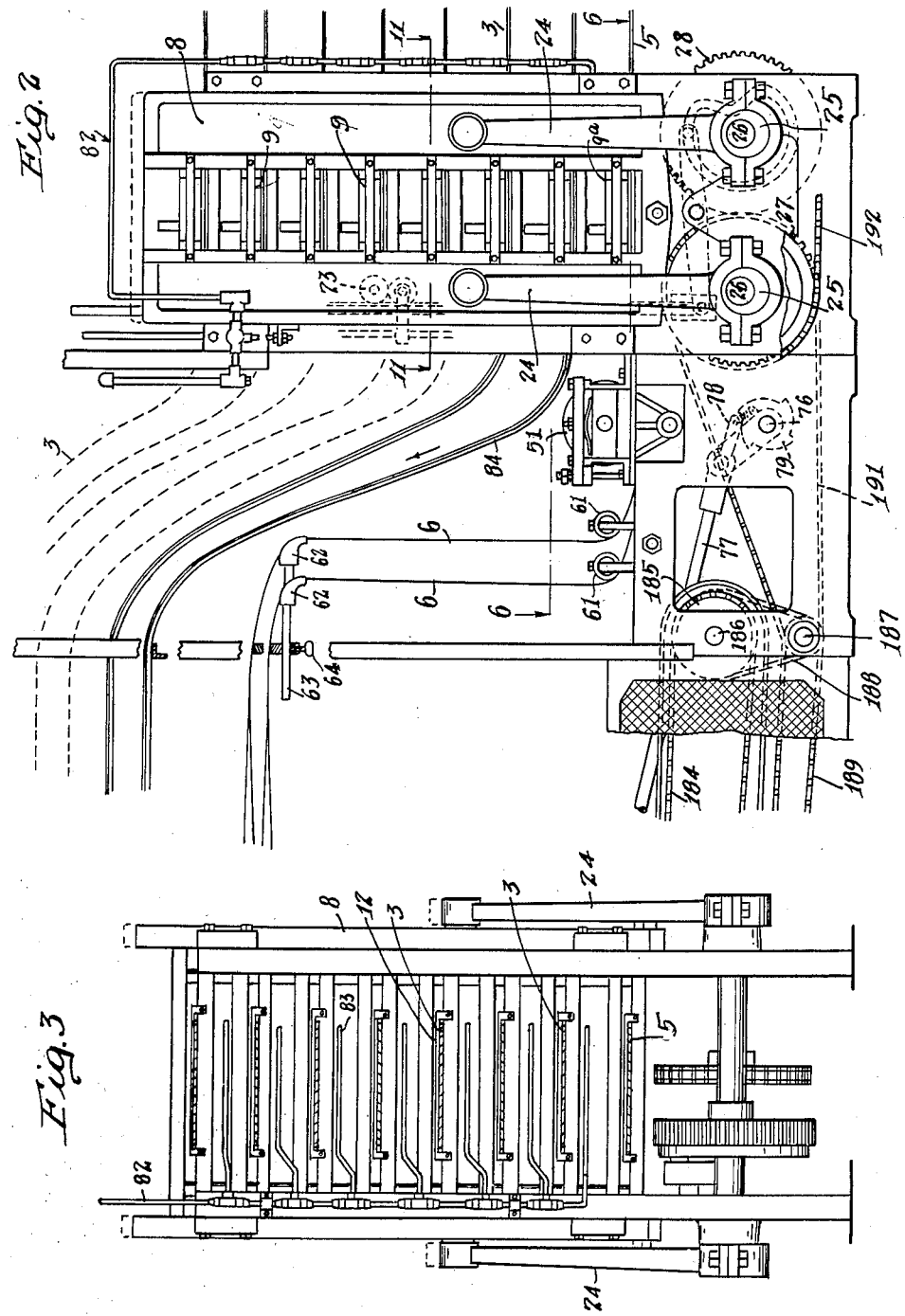
INVENTOR.
Roy S. Davis
BY Lyon & Lyon
ATTORNEYS

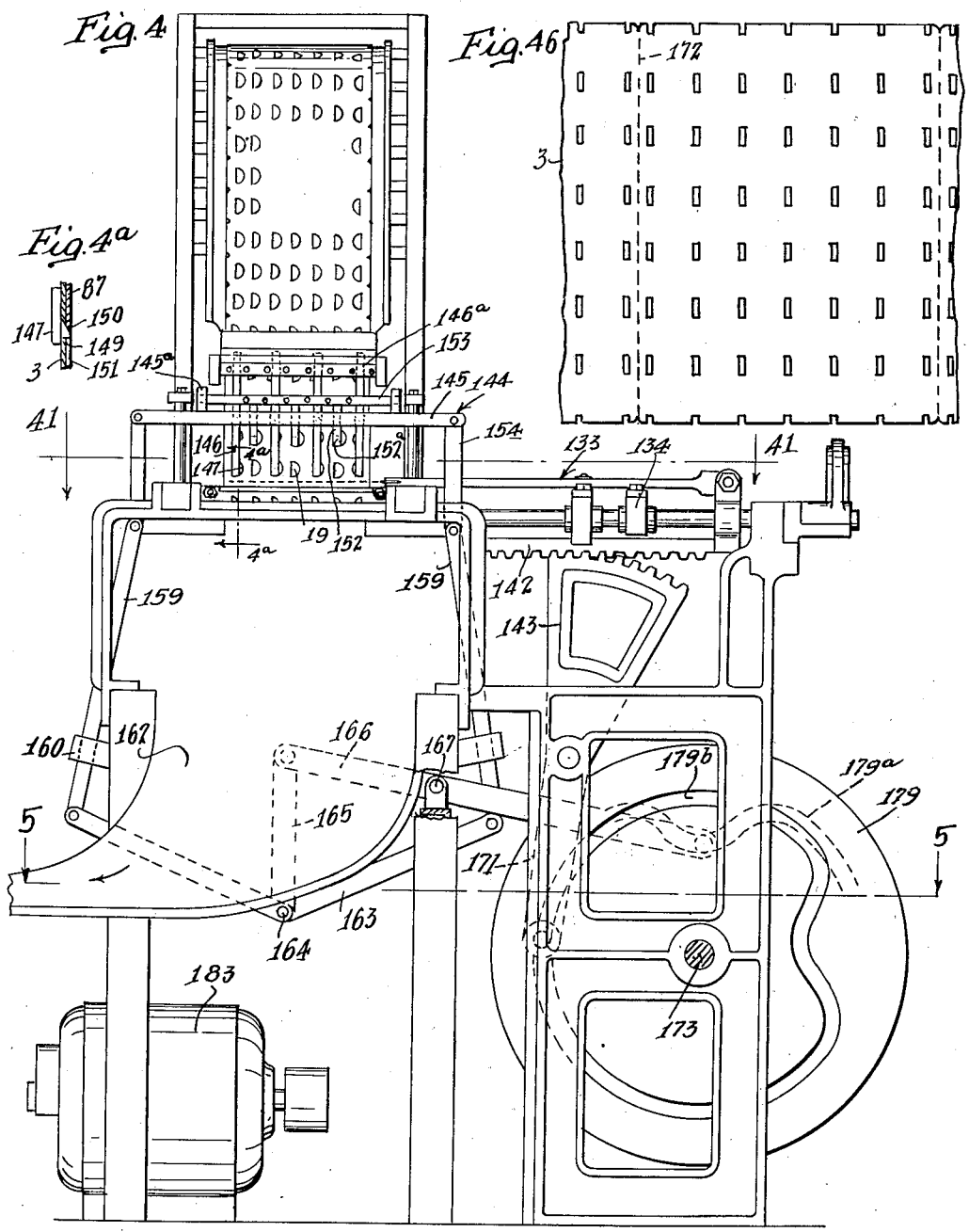

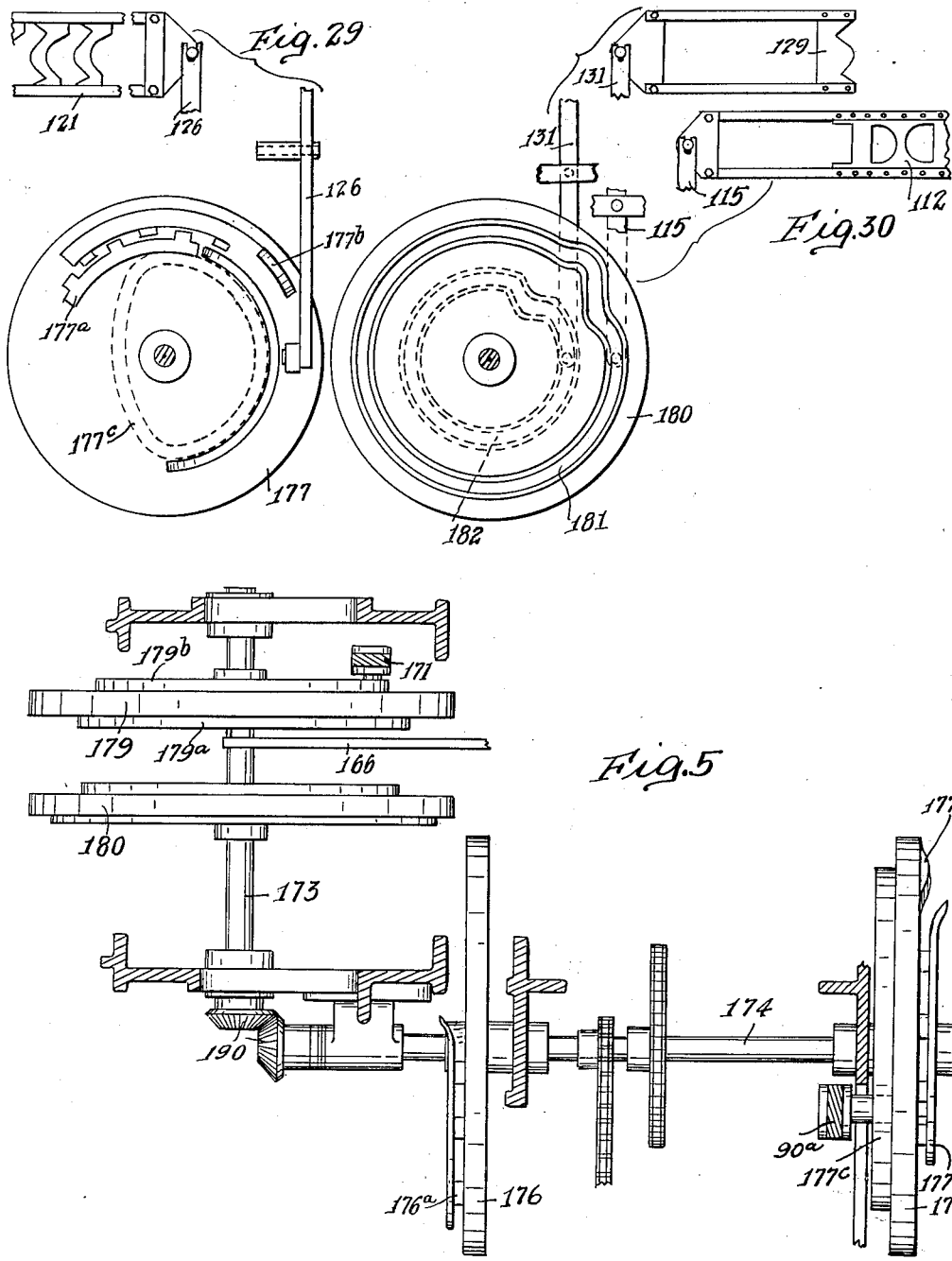

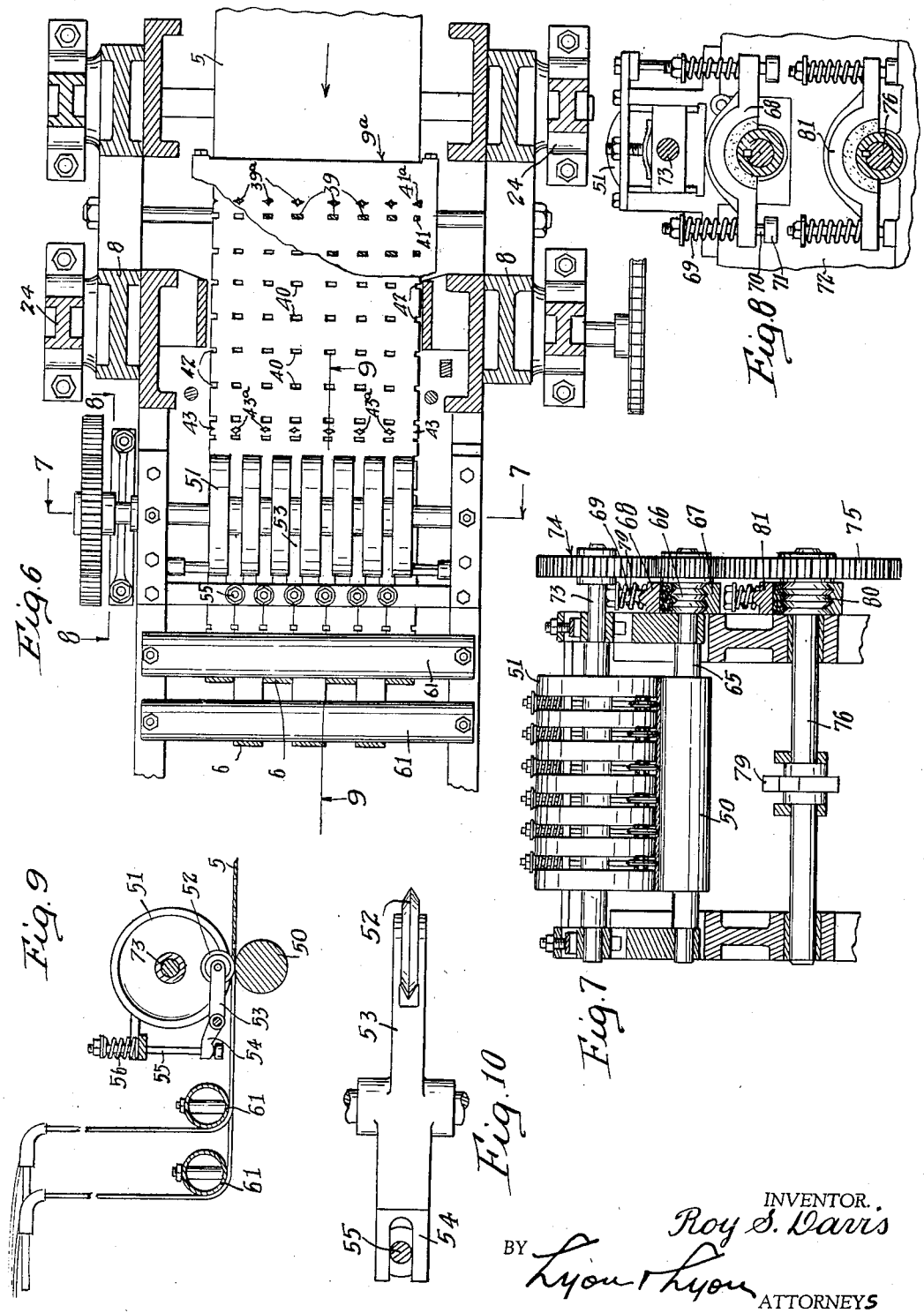

March 21, 1939.  R. S. DAVIS  2,151,015
MACHINE FOR MAKING EGG BOX FILLERS
Filed April 16, 1937   12 Sheets-Sheet 6
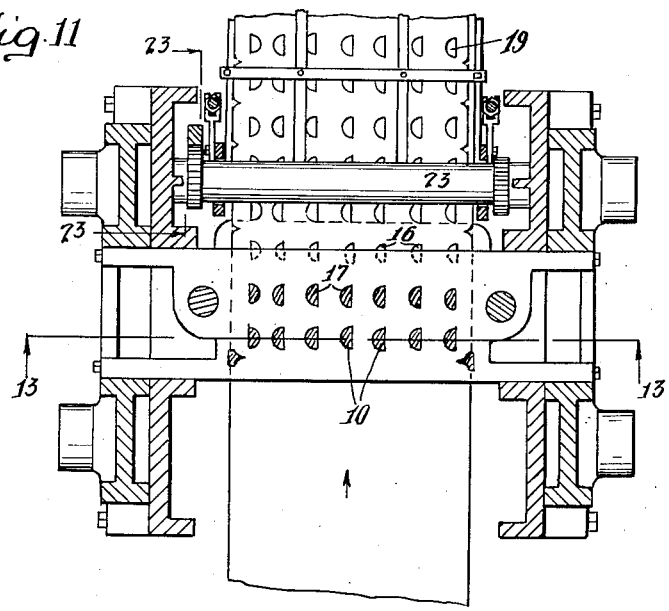
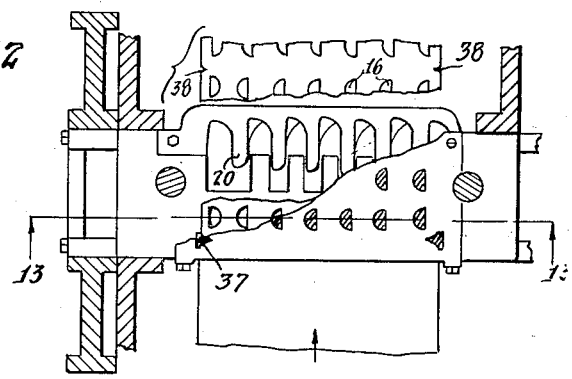
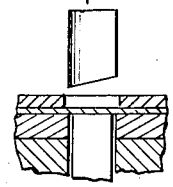
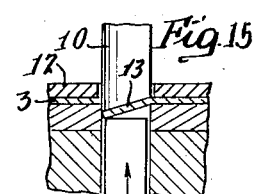
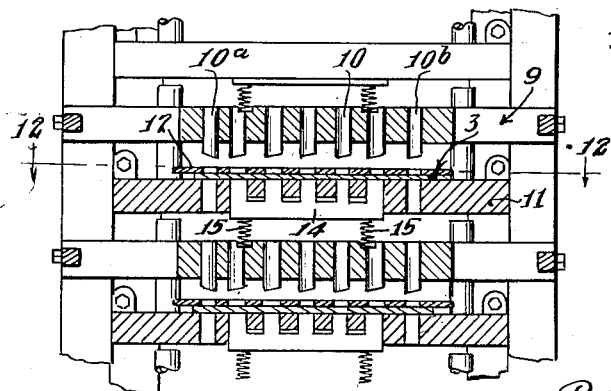
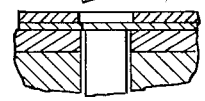
INVENTOR.
Roy S. Davis
BY Lyon & Lyon
ATTORNEYS March 21, 1939.    R. S. DAVIS    2,151,015
MACHINE FOR MAKING EGG BOX FILLERS
Filed April 16, 1937    12 Sheets-Sheet 7
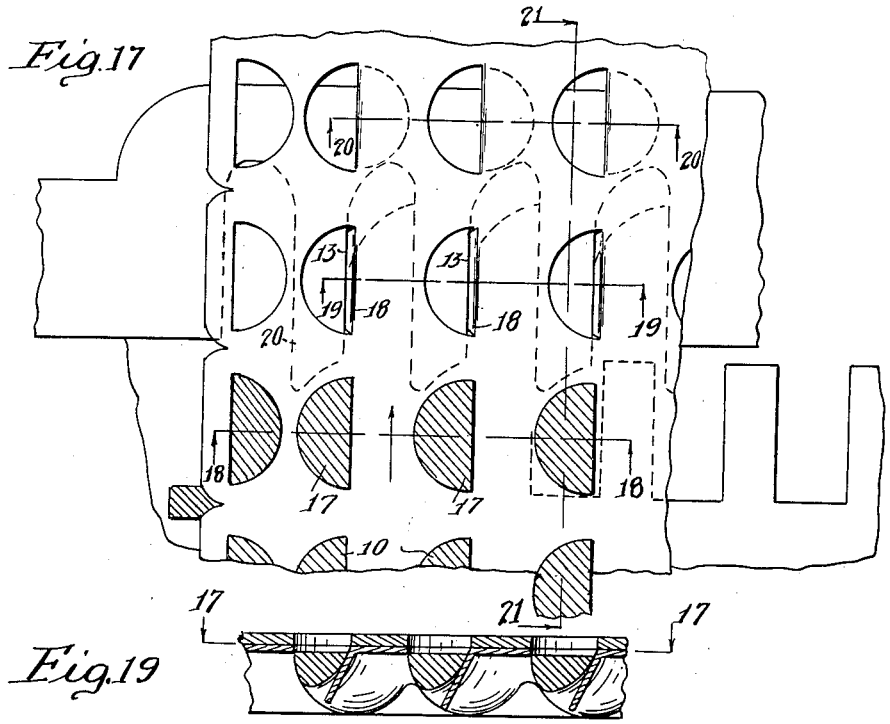
Fig. 17
Fig. 19
Fig. 20
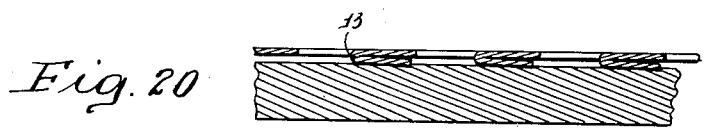
Fig. 18
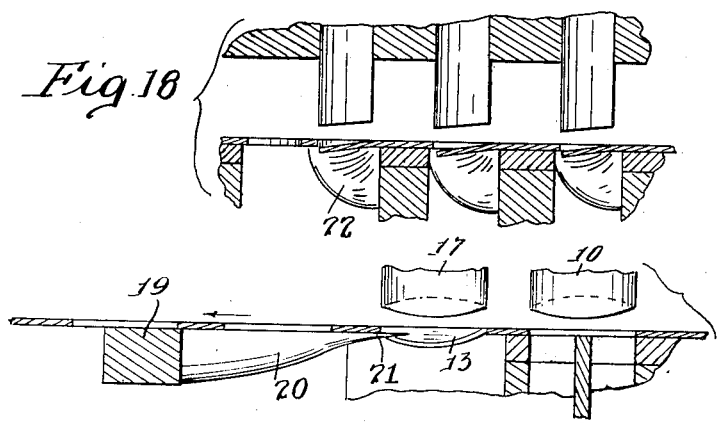
Fig. 21
INVENTOR.
Roy S. Davis
BY Lyon & Lyon
ATTORNEYS

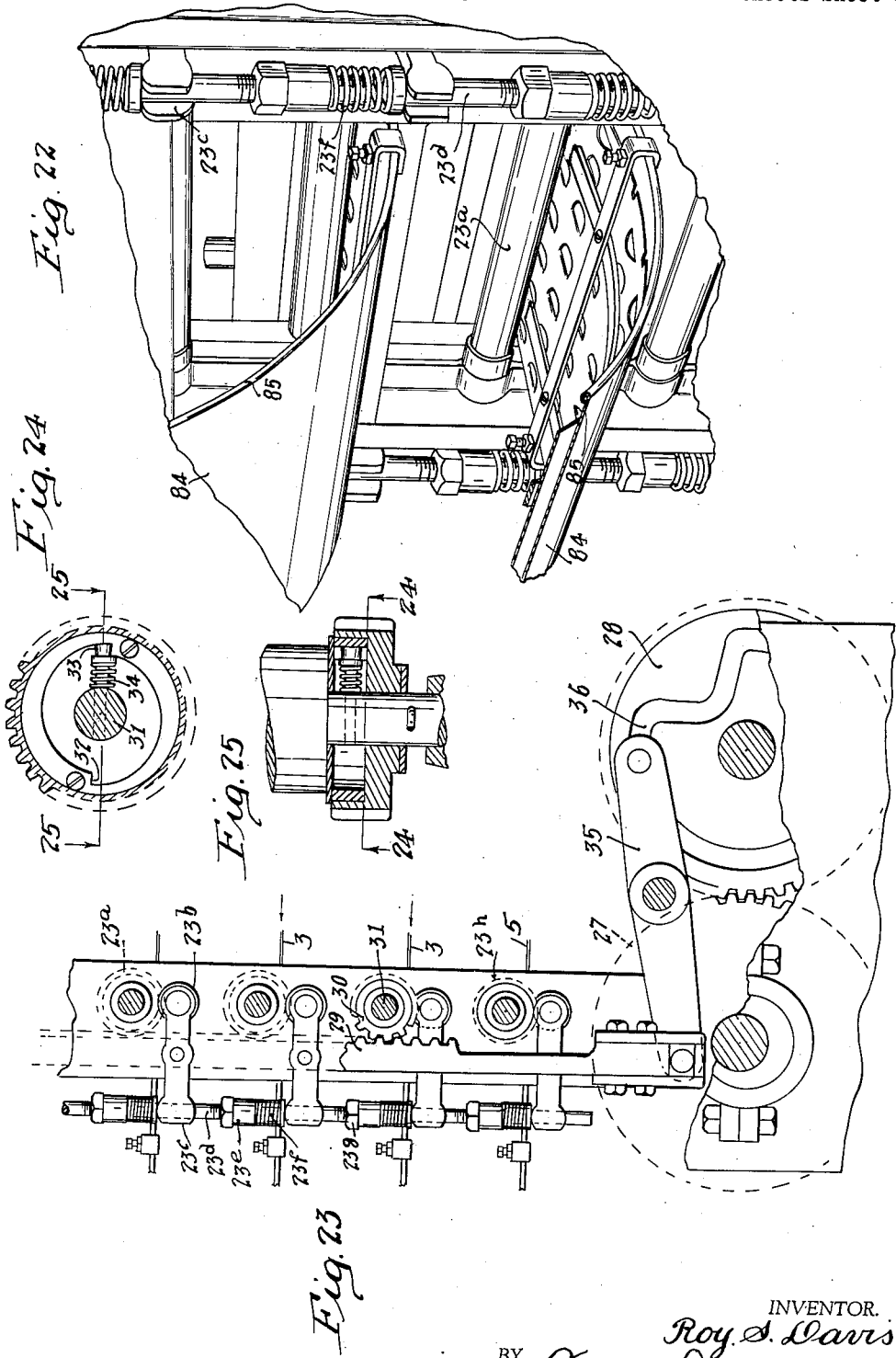

March 21, 1939.  R. S. DAVIS  2,151,015
MACHINE FOR MAKING EGG BOX FILLERS
Filed April 16, 1937  12 Sheets-Sheet 9
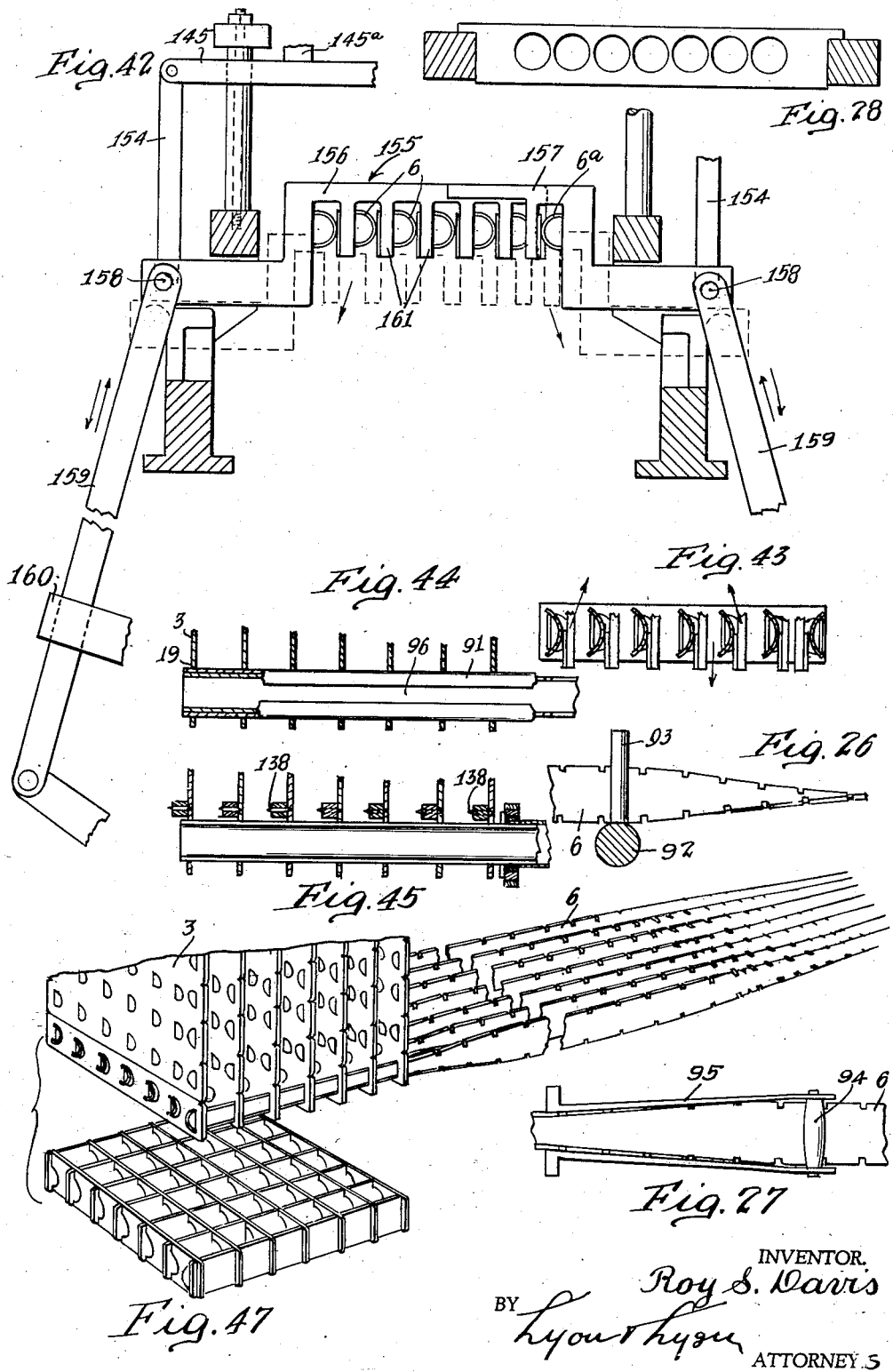

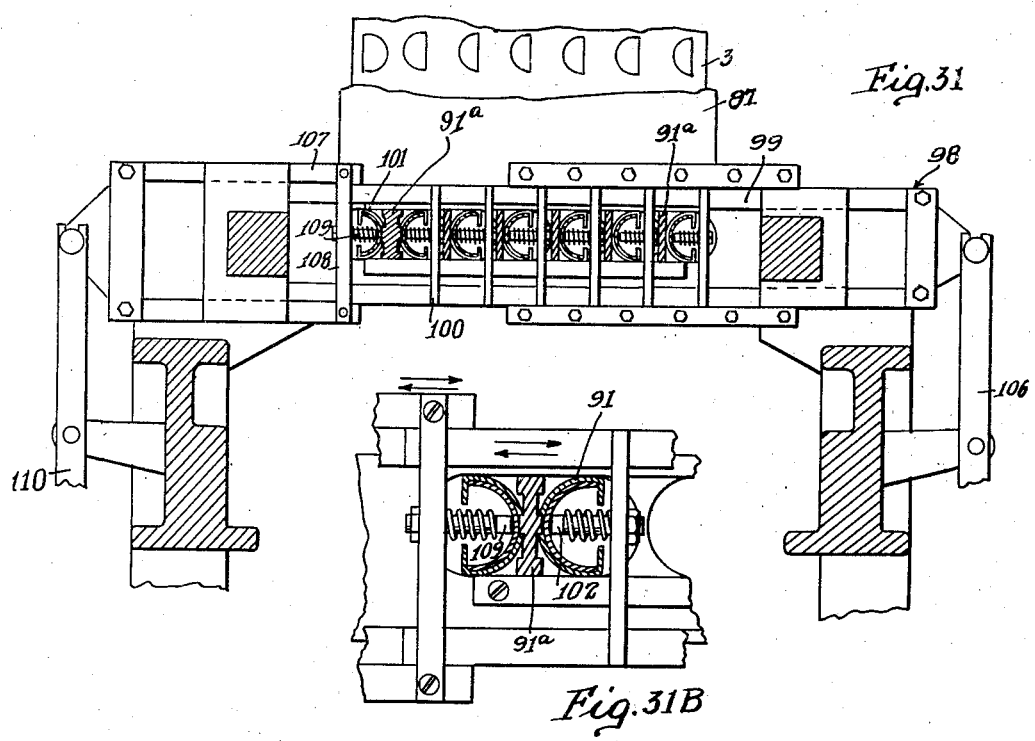
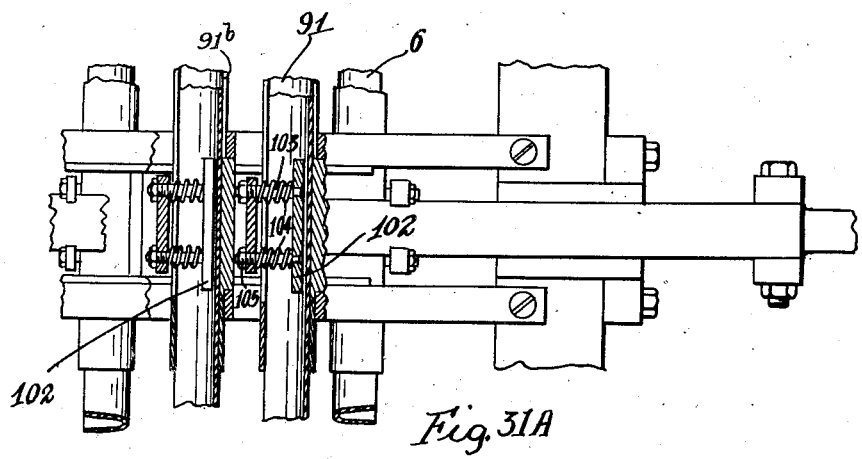

March 21, 1939.    R. S. DAVIS    2,151,015
MACHINE FOR MAKING EGG BOX FILLERS
Filed April 16, 1937    12 Sheets-Sheet 11
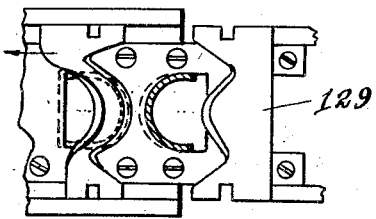
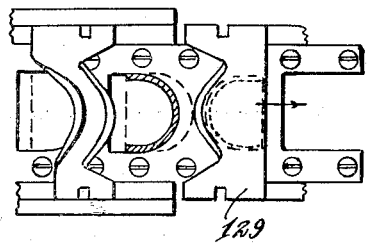
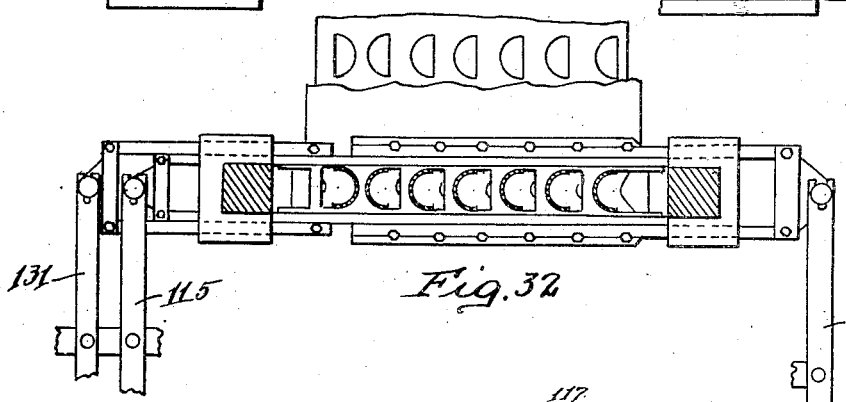
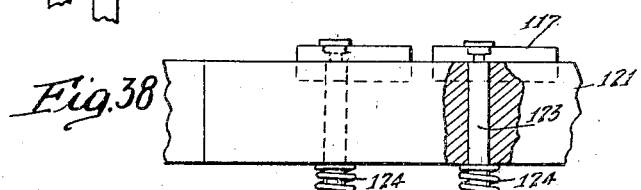
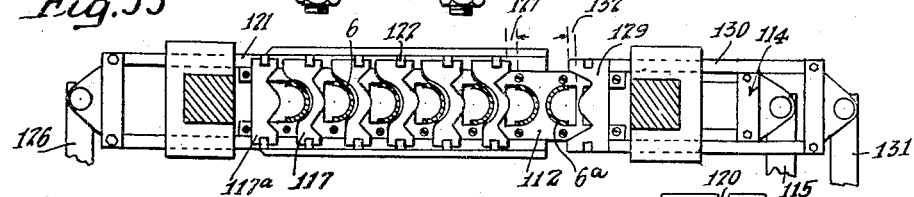
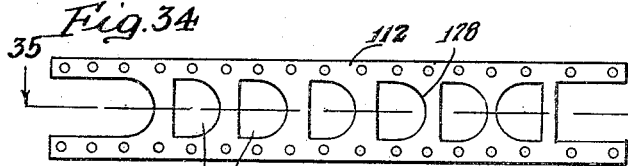
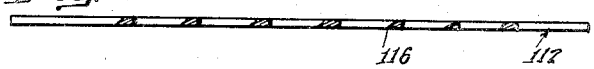
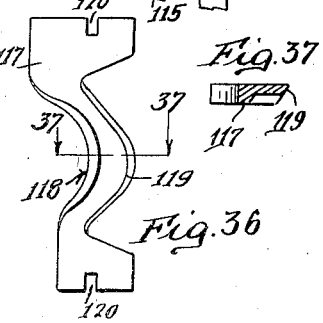
INVENTOR.
Roy S. Davis
BY Lyon & Lyon
ATTORNEYS

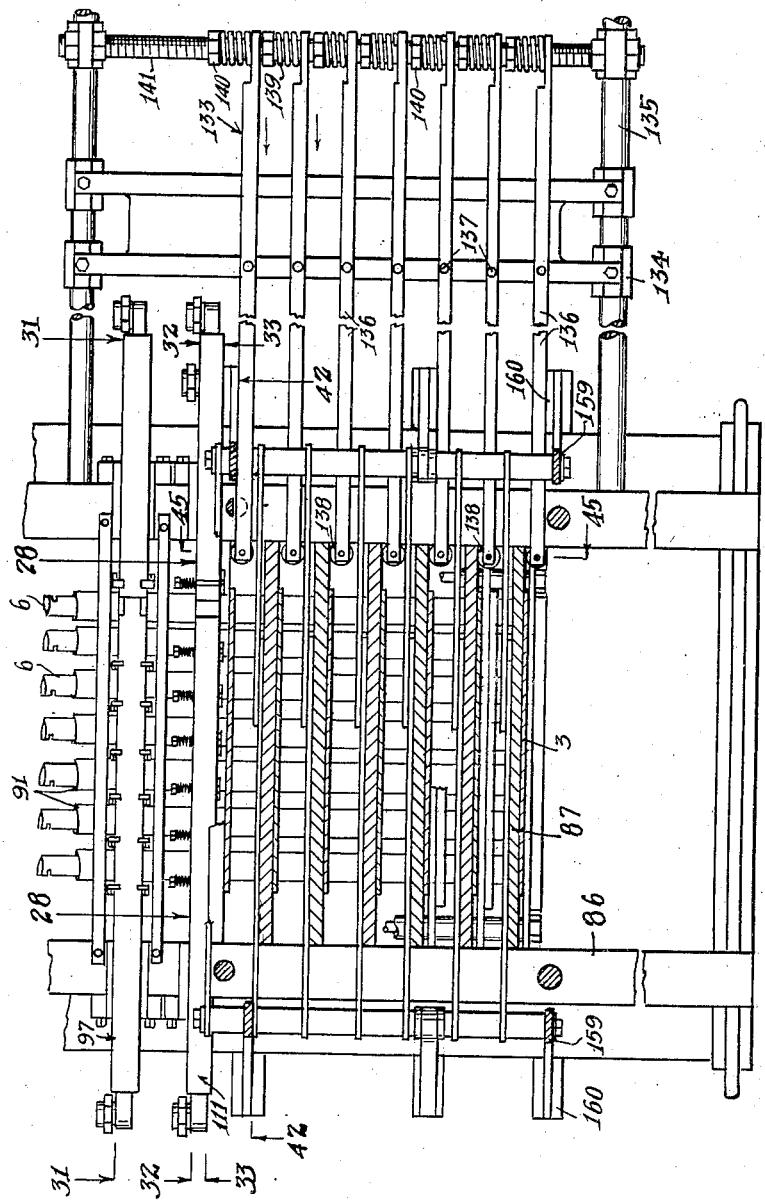

Patented Mar. 21, 1939

2,151,015

UNITED STATES PATENT OFFICE 2,151,015

MACHINE FOR MAKING EGG BOX FILLERS

Roy S. Davis, Hollywood, Calif.

Application April 16, 1937, Serial No. 137,197

45 Claims. (Cl. 93—37)

This invention relates to a machine for producing egg box fillers, that is to say, the small frames usually made of cardboard and which are inserted in egg cases to form compartments to receive the eggs.

The general object of this invention is to produce an automatic machine of simple construction, which will operate to form the egg box fillers from webs of paper stock taken directly from the roll. These egg box fillers are, of course, composed of a set of walls or bars of paper extending in one direction, and another set of similar walls passing through openings in the opposite set of walls and having an interlocking relation with the same. A filler of this type is patented to me in my Patent No. 1,498,785, dated the 24th day of June, 1924. One of the objects of my invention is to provide an automatic machine of simple construction for producing an egg box filler of the type to which I refer.

While it is true that the webs of paper stock may be fed forward to the machine by any suitable means, it is nevertheless one of the objects of my invention to provide improved means whereby the machine itself automatically effects the pulling forward of the webs of stock from the rolls. In the preferred embodiment of the invention, the machine is constructed so as to support a plurality of webs of paper spaced apart, and one of the objects of the invention is to provide simple means for carrying ribbons or strips of stock through the spaced webs and for effecting an interlocking between the ribbons and the webs; also to provide simple means operating thereafter to sever the forward portions of the ribbons that are threaded through the webs and to sever the ends of the webs to produce the egg box fillers.

In the operation of the machine, I provide a plurality of webs of paper or similar stock, with means for holding the same in a substantially parallel relation and disposed apart. Where the articles such as eggs, are of equal size, of course, the webs should be equidistant from each other. The machine provides means for forming threading openings in these webs, and while the webs are held so that these openings are in alignment, ribbons of stock are threaded through the same. The edges of these ribbons are preferably provided with notches, and the ribbons are held in a somewhat compressed or collapsed condition when being threaded through the openings in the webs. After being threaded through the openings, the ribbons are expanded or flattened out to their original condition, so as to enable the notches in their edges to interlock with the webs. The ends of the webs and the ends of the interlocking ribbons are then severed so as to produce the egg box filler.

One of the objects of the invention is to provide a machine of simple construction, for accomplishing these results.

Although the threading openings for the ribbons may be punched in the webs at any stage in the operation of forming the fillers, in the preferred embodiment of the invention, I provide a multiple punch press for punching the threading openings in the webs, and for forming perforations in a special web or "ribbon" web; and one of the objects of the invention is to provide a press of simple construction for accomplishing this punching operation in coordination with the mechanism of the machine that functions to thread the ribbons through the threading openings; also, to provide means for slitting the ribbon web longitudinally in line with the perforations in the same, so as to form a plurality of ribbons notched on both their edges.

In the operation of the machine, as stated above, the ribbons held in a cupped or transversely curved condition, are threaded through the openings in the webs. After this operation has been effected, the threaded portions of the ribbons are severed from the ribbon stock that is being fed through the machine. In practice, in forming the fillers, it is advantageous to have all of the ribbons except one outside ribbon curved or cupped in the same direction. One outside ribbon or special ribbon is cupped or curved in the opposite direction from all the rest. This reversal of position of one of the ribbons complicates the problem of severing all of the ribbons; and one of the objects of the present invention is to provide simple means for overcoming this difficulty, and to provide efficient mechanism for severing all of the ribbons expeditiously.

In the preferred construction of the machine, it includes an assembling unit that receives the punched webs and the ribbons from the punching unit, and in the assembling unit the webs preferably pass downwardly in a substantially vertical plane, being disposed slightly apart to correspond with the width of the egg compartments in the finished filler.

One of the objects of the invention is to provide simple means for effecting a periodic downward feeding movement of the webs so as to present their aligning openings opposite the threading bobbin which carries the ribbons through the same; also, to provide simple means for straightening the transversely curved ribbons after they have been threaded through the webs, and means for ejecting each filler as the same is produced by severing the same from the web stock and ribbon stock.

A further object of the invention is to improve the general construction of machines for making egg box fillers.

Further objects of the invention will appear hereinafter.

The invention consists in the novel parts and combination of parts to be described hereinafter, all of which contribute to produce an efficient machine for making egg box fillers.

A preferred embodiment of the invention is described in the following specification, while the broad scope of the invention is pointed out in the appended claims.

In the drawings:

Fig. 1—A is a side elevation diagrammatically illustrating the complete machine, and indicating the path of the gang of webs and the ribbon web as they pass through the machine.

Fig. 1—B is a side elevation illustrating the supply rolls and webs leading off from the same to cooperate with the mechanism illustrated in Fig. 1—A.

Fig. 2 is a side elevation of the multiple press through which all of the webs pass, and in which the gang of webs is punched to form the threaded openings, and the special web or ribbon web is perforated to form notches in the edges of the ribbons. This view also illustrates the driving means for this mechanism, and also shows the slitting mechanism for slitting the special web into ribbons.

Fig. 3 is an elevation of the mechanism shown in Fig. 2 as viewed from the right side, and showing the webs in cross-section where they pass between the cooperating punching dies.

Fig. 4 is an elevation of the machine as viewed from the left end of Fig. 1—A, and particularly illustrating the carriage for carrying the cutters that sever the webs, and also the actuating means for the same. This view also illustrates the pulling mechanism that pulls the webs down in a step-by-step movement to bring their openings into position to cooperate with the threading bobbins.

Fig. 4—a is a section on the line 4—a, 4—a of Fig. 4, and further illustrating the details of the feeding means for pulling down the webs.

Fig. 5 is a horizontal section taken about on the line 5—5 of Fig. 4, and particularly illustrating the cams and camshaft arrangement. In this view many parts are omitted.

Fig. 6 is a horizontal section taken about on the line 6—6 of Fig. 2, further illustrating details of the multiple press, some parts being broken away. This view also shows the ribbon web with the perforations in the same, and also shows the slitting mechanism through the medium of which the ribbon web is slit into ribbons.

Fig. 7 is a vertical section taken on the line 7—7 of Fig. 6, and further illustrating details of the slitting mechanism.

Fig. 8 is a section taken on the line 8—8 of Fig. 6, and particularly illustrating the bearings for the shafts and rollers of the slitting mechanism.

Fig. 9 is a section taken about on the line 9—9 of Fig. 6, and further illustrating the slitting mechanism and means for breaking the slitted ribbon web apart into ribbons, and for guiding the ribbons up to an elevated point at about the level of the carriage that threads the ribbons through the perforated webs.

Fig. 10 is a plan of one of the slitting levers with its rotary cutter, and showing a portion of the shaft broken away.

Fig. 11 is a section taken about on the line 11—11 of Fig. 2, and further illustrating details of the punch press and showing the punches in cross-section that operate to form half round openings in the webs, and notches in their edges.

Fig. 12 is a horizontal section taken about on the line 12—12 of Fig. 13, with certain parts broken away and particularly illustrating means which I employ for turning over flaps which may be left connected to the edges of the openings that are punched in the webs.

Fig. 13 is a vertical section taken about on the line 13—13 of Fig. 11, and illustrating the dies and punches which cooperate to perforate the webs. This view also illustrates followers for pushing back the connected flaps at the perforations.

Figs. 14, 15 and 16 are vertical sections upon an enlarged scale, illustrating the successive stages of punching the openings in the webs, and returning the flap back into the plane of the web.

Fig. 17 is a diagrammatic view corresponding to Fig. 12, and further illustrating the relation of the web and turning device, which operate to turn the flaps back and fold them substantially into the plane of the web.

Fig. 18 is a fragmentary vertical section taken on the line 18—18 of Fig. 17, and illustrating the web in cross-section with the flaps located just in front of the turning devices which fold them over into the relation illustrated in Fig. 20.

Fig. 19 is a fragmentary section on the line 19—19 of Fig. 17, showing the flaps at a further stage in the operation of folding them over into the plane of the web.

Fig. 20 is a fragmentary section taken on the line 20—20 of Fig. 17, and showing the flaps completely folded over.

Fig. 21 is a fragmentary section taken on the line 21—21 of Fig. 17, illustrating details of the punch mechanism and the means for folding over the flaps.

Fig. 22 is a perspective of the rear, or delivery, side of the punch press, certain parts broken away, and illustrating the guides for the webs after they pass from the punch press. This view also illustrates portions of the mechanism cooperating with the feed rollers to feed the webs through the punch press.

Fig. 23 is a fragmentary side elevation of the feed roller mechanism preferably incorporated in the punch press for feeding the webs through the same. This view shows parts broken away, and illustrates the means for periodically rotating the feed rollers to advance the webs through the punch press with a step-by-step movement.

Fig. 24 is a vertical section upon an enlarged scale on the line 24—24 of Fig. 25, and particularly illustrating a one-way clutch construction, which I prefer to employ for rotating the feed rollers in one direction only from a reciprocating rack illustrated in Fig. 23.

Fig. 25 is a horizontal section taken about on the line 25—25 of Fig. 24.

Fig. 26 is a fragmentary vertical section particularly illustrating guiding means where the ribbons are twisted from a horizontal plane into a vertical plane just before they pass into the tubular threading bobbins; this view illustrates a portion of a ribbon being turned as stated, the ends of the ribbon being broken away.

Fig. 27 is a side elevation of a guide into which each ribbon passes as it passes into its corresponding bobbin tube. This guide operates to bend the ribbon on a longitudinal axis so that it assumes the arc form of the curved edge of the half-round openings that are punched in the webs to receive the ribbons. This view shows a portion of a ribbon broken away.

Fig. 28 is a fragmentary section on the line 28—28 of Fig. 41, illustrating a guide block for the bobbin tubes that carry the ribbons through the webs.

Fig. 29 is a fragmentary diagrammatic detail illustrating the main relatively movable ribbon cutter partially broken away, and illustrating a cam lever for operating the same.

Fig. 30 is a view similar to Fig. 29, but illustrating the relatively fixed main ribbon cutter; and also illustrating the special cutter for cutting the special ribbon that is curved to face in an opposite direction from the rest of the ribbons.

Fig. 31 is a fragmentary vertical section through the assembling mechanism on the line 31—31 of Fig. 41, certain parts being broken away; this view is taken in a plane parallel with the webs. In this view, however, for the sake of clearness, the threading bobbins are shown in elevation instead of in section, while the curved ribbons held in the bobbins are shown in section. This view particularly illustrates holding means for holding the forward ends of the ribbons when the bobbins withdraw after their forward threading movement.

Fig. 31—A is a plan of the right end of the mechanism shown in Fig. 31, certain parts being broken away.

Fig. 31—B is a detail upon an enlarged scale showing the left end of the holding device illustrated in Fig. 31.

Fig. 32 is a vertical section through the assembling unit, and particularly illustrating the cutting mechanism for severing the ribbons. This view shows this mechanism as viewed from the side opposite the relatively movable cutters. This view shows a portion of a guide plate for a web, and a portion of a web broken off beyond the plate.

Fig. 33 is a view similar to Fig. 32, but showing the ribbon cutting mechanism from the side of the relatively movable knives. This section is taken on the line 33—33 of Fig. 41.

Fig. 34 is a front elevation of a relatively fixed cutter or die, of the ribbon cutting mechanism.

Fig. 35 is a vertical section through the relatively fixed cutter plate illustrated in Fig. 34; this section is taken on the line 35—35 of Fig. 34.

Fig. 36 is a front elevation of one of the typical knives of the main relatively movable cutter. This view is upon an enlarged scale.

Fig. 37 is a cross section through the knives shown in Fig. 36, taken on the line 37—37 of this figure.

Fig. 38 is a fragmentary plan and partial section illustrating means for yieldingly holding the relatively movable cutters against the relatively fixed cutter of the ribbon cutting mechanism. In this view certain parts are broken away and shown in section.

Fig. 39 is a fragmentary view corresponding to the right end of the cutter blades shown in Fig. 33, and particularly illustrating the first movement of the relatively fixed cutter and the first movement of the main relatively movable cutter cooperating with the same.

Fig. 40 is a view similar to Fig. 39, but illustrating the second movement of the relatively fixed blades, and the movement of the special relatively movable cutter that severs the special reversely curved ribbon, which is at the extreme right in Fig. 33.

Fig. 41 is a horizontal section through the assembling unit taken about on the line 41—41 of Fig. 4, and particularly illustrating the relation of the holding mechanism for holding the forward ends of the ribbons when the bobbin withdraws, and also the ribbon cutting mechanism and the mechanism for severing the webs. In this view certain parts are broken away.

Fig. 42 is a vertical section taken about on the line 42—42 of Fig. 41, and particularly illustrating the straightening means for straightening the curved ribbons to restore them to their vertical plane and flat condition. This mechanism also operates as an ejector for pulling down each filler as it is severed from the webs and the ribbons.

Fig. 43 is a diagrammatic view illustrating a further stage of this operation of straightening the ribbons.

Fig. 44 is a diagrammatic view taken in a vertical plane, certain parts being broken away and illustrating the manner in which the threading bobbins carry the ribbons through the openings in the webs.

Fig. 45 is a fragmentary view similar to Fig. 44, but showing the threading bobbin withdrawn. This view illustrates the relation of the cutters that sever the webs, and also illustrates the guide for the bobbin tubes illustrated in Fig. 28.

Fig. 46 is a fragmentary view showing a portion of the perforated special web or "ribbon web".

Fig. 47 is a perspective illustrating diagrammatically the relation of the webs and the ribbons, and shows the forward ends of the ribbons threaded through the webs to form a filler in the lower end of the webs, which is then cut off by severing the webs and the forward portions of the ribbons.

Referring particularly to Figs. 1—A and 1—B, the machine preferably includes a punching unit 1 and an assembling unit 2, the said punching unit preferably including a gang press having a gang of punching dies for punching a gang of webs 3, said webs being guided so as to pass horizontally through the press, and being drawn off from a plurality of supply rolls (see Fig. 1—B). The gang of dies that operate upon the webs 3 are all alike, and punch threading openings in the webs 3. These openings are preferably of half round form. One of the punching dies, preferably the one at the bottom, is a special die, and intended to operate upon the special web 5, which I refer to hereinafter as a "ribbon" web because this web is slit longitudinally into a plurality of ribbons represented generally by the numeral 6. This web 5 is drawn off from the supply web 7.

Referring particularly to Figs. 2, and 11–16, the punch press included in the punching unit, includes a reciprocating punch head or slide 8 that carries the typical punching dies 9 (see Fig. 13) each die comprising a horizontal plate carrying a plurality of punches 10 disposed in a row across each web 3, each web being supported on a shelf plate 11 having female openings for the punches 10, and being provided with a stripper plate 12 through which the punches pass in punching the web. These punches are preferably half round in cross-section (see Fig. 11) and all of the punches 10 are formed so that although they punch a flap 13 out of each web, they do not operate to sever this flap from the web. After each punching die 9 has descended, the flaps 13 are pushed back automatically to the plane of the web by pressers 14, which are spring-pressed upwardly by coil springs 15. Each die 9 is provided with outside special punches 10a and 10b that are slightly longer than the intermediate punches 10, so as to completely sever the flaps punched at these points. After the flaps have been returned to the planes of the webs, the webs 3 are all automatically advanced in the direction of the arrows indicated in Fig. 11, so that the half round openings 16 that have been punched in them will be brought into line with the second row of punches 17 which, at each descent of the die 9, push the flaps down slightly below the plane of the web. As the web advances from this point, these flaps are folded down automatically against the under side of the web. In this connection, it should be understood that the straight edge 18 carrying each flap 13, extends in the direction in which the web is advanced (see Fig. 17). Just beyond the location of the second row of punches 17 I provide a flap folder 19 (see Figs. 17-21), which flap folder comprises a cross bar with a plurality of forwardly projecting tongues 20, which tongues taper to a relatively sharp point 21 (see Fig. 21) that engages the upper side of the flap as the web approaches and bends it over through the agency of a rounded cam face 22, until the flap is bent back under the web, as indicated in Fig. 20. Just beyond this point and as the webs pass out of the machine, they pass between feed rollers 23 (see Fig. 11 and Fig. 2) which feed rollers are periodically rotated so as to advance the webs with a step by step movement. The reciprocating press head 8 is moved up and down by any suitable means; for example, two connecting rods 24 (see Fig. 2), the lower ends of which connect to eccentrics 25 carried on two stub shafts 26, said shafts respectively carrying rigid gear wheels 27 and 28, which mesh together and cause the shafts 26 to rotate at the same speed, but in opposite directions. The feed rollers 23 include upper rollers 23a rotating on a fixed axis, and presser rollers 23b, which are spring-pressed, and which press the webs up against the under side of the rollers 23a. The presser rollers 23b are carried individually on levers 23c located at the ends of the rollers, and the ends of these levers 23c are bifurcated to receive a suitable spring tension mechanism including a stem 23d carrying collars 23e against which coil springs 23f thrust, the other ends of the springs thrusting against washers seating on the bifurcated ends of the levers. The state of compression of these coil springs may be regulated by nuts 23g threaded on the stem 23d. However, it should be understood that this particular tension means is of no importance, and any other tension means may be provided for insuring that the presser rollers will be pressed with sufficient force against the rollers 23a to insure the effective feeding movement of the webs past the dies. The rollers 23a are rotated in one direction only through the agency of a reciprocating rack 29 (see Fig. 23) said rack meshing with a pinion 30 loosely mounted on the shaft 31 of each roller 23a. This pinion operates through a one-way drive connection to drive its corresponding roller in one direction only. Any suitable means may be provided for this purpose. In Figs. 24 and 25 I illustrate the pinion as being provided with a pair of diametrically opposite shoulders 32, which engage with the end of the driving pin 33 that projects radially outwardly from the shaft 31, and is pressed outwardly by a coil spring 34.

The rack 29 is reciprocated by any suitable means; for example, by means of a lever 35, one end of which is actuated by a cam slot 36 on the side of the remote gear wheel 28.

In addition to punching the half round openings 16 in the webs, each punching die 9 includes a pair of special punches 37 (see Fig. 12) the function of which is to punch notches 38 in the webs at an intermediate point midway between the rows of half round openings 16.

The gang press 1 includes a bottom die 9a, (Figure 6) of special construction, which has seven transverse rows of punches 39 with six punches per row. These punches 39 punch elongated or rectangular perforations 40 throughout the area of the web 5. At each end of each row of punches 39 smaller punches 41 are provided that punch notches 42 in the edge of web 5. There is an eighth row of punches in this group consisting of six punches 39a that punch perforations 43a and two punches 41 that punch perforations 43. Fig. 6 shows only one corner of the stripping plate for this group of punches.

After the punched web 5 has passed from the punch press it passes through slitting mechanism that slits the web into ribbons by slits in line with the centers of the perforations 40 and 43a and, of course, longitudinally of the web. This mechanism includes a transverse roller 50 under the web (see Fig. 9) and a plurality of rollers 51 that press the web down onto the roller 50. These rollers are rotated with a step-by-step movement to pull the web 5 through the punching die 9a, by means that will be described hereinafter. They pull the web 5 past an idler roller 23b.

Between the rollers 51 a plurality of rotary cutting knives 52 are provided, each knife being carried on a lever 53 having a tail arm 54, which is pulled up by means of a stem 55 and coil spring 56 to press the edge of the cutter against the web and slit it longitudinally. The web 5 may, if desired, be passed down through a special tensioning device 57 (see Fig. 1—A) before passing it through a special adjustable drive device including a feed roller 58 cooperating with a lower roller driven by a sprocket wheel 59 on its shaft, which sprocket wheel is driven by a sprocket chain 60. The detail of the drive for the sprocket chain 60 will be described hereinafter. From the feed roller 58 the web 5 passes up to a slightly higher level, as indicated in Fig. 1—A, to pass through the lowermost punching die that carries the punches 39 and 41, and the punches 39a and 41a. The roller 58 of the special drive supplies slack in the web 5, so that the bobbin in pulling the ribbons 6, never jerks the supply roll 7 so as to tear the web.

After leaving the slitting mechanism, the web 5 is broken apart into separate ribbons 6 by simply guiding the alternating ribbons 6 in a lateral direction (see Fig. 2). The alternate ribbons 6 pass under fixed round guide bars 61, and thence upwardly around adjustable curved guides 62 carried on the ends of stems 63, which can be clamped in any outward adjusted position by means of a set screw 64.

Referring again to the slitting mechanism, the rollers 50 and 51 operate as feed rollers to pull the web 5 through the punching die 9a and past the slitting cutters 52. The drive for these rollers will be described hereinafter. I provide means for preventing these rollers from being rotated by their own momentum when pushed forward by the step-by-step drive movement.

For this purpose I provide the shaft 65 of the roll 50 with a brake collar 66 (see Fig. 7) that is of grooved form, lying in a brake bearing 67 and having a brake shoe 68 that is pressed down onto the same by coil springs 69 (see Fig. 8). These coil springs are carried on stems 70 seated in lugs 71 on the side of the frame 72 of the slitting mechanism. The shaft 73 of the rollers 51 is rotated in the opposite direction from the shaft 65 through a gear train 74, including a driving gear 75 on a shaft 76, which shaft is rotated periodically with a step-by-step movement through the agency of a push rod 77 and a pawl 78 (see Fig. 2) co-operating with a ratchet wheel 79 on the shaft 76. The means for actuating the push rod 77 will be described hereinafter. If desired, to secure greater braking force than that afforded by the grooved collar 66, I may provide a similar grooved collar 80 on the shaft 76 (see Fig. 7) with which a brake shoe 81 cooperates similar to the brake shoe 68, and mounted in a similar way (see Fig. 8).

It should be remembered that a number of the punches in the punch press completely punch out the material to form flapless openings, and there may be a tendency for these flaps to get into the machinery and clog it. For this purpose if desired, the machine may be provided with a pneumatic blowing system including piping 82 supplied with compressed air, and this piping may include delivery nozzles 83 (see Fig. 3) that extend into the punch press from side pipes.

When the gang of webs 3 pass from the punch press, they are carried out on curved guideways 84 (see Fig. 22). These guideways are in the form of plates with beads 85 at their edges, and they extend up in an inclined direction as indicated in Fig. 2, so as to carry the webs forwardly to a point above the assembling unit 2. (See Fig. 1—A.) At this point the webs curve downwardly and pass down through the assembling unit 2 so that they are disposed in a vertical plane, and spaced equidistant from each other. In other words, they pass down through the interior of a casing or frame 86, comprising a plurality of vertical guide plates 87 (see Fig. 41) and by means to be described hereinafter, the webs are advanced periodically in a downward direction and with all of their half round openings 19 in alignment with each other. The ribbons 6 are then advanced by mechanism now to be described, to thread the ribbons through the aligned openings 19 of the webs 3. This mechanism includes a gang bobbin 88 (see Fig. 1—A) which bobbin is reciprocated periodically by means of a rack 89 meshing with a segment 90. The gang bobbin 88 is guided to move horizontally toward and from the frame 86, employing a construction similar to that illustrated in Fig. 4 for actuating a cutter frame to be described hereinafter. This gang bobbin 88 includes a plurality of bobbin tubes 91 (see Figs. 41 and 44) but before the ribbons pass into the bobbin tubes they are twisted out of a horizontal plane into a vertical plane. For this purpose they pass over a transverse guide bar 92 (see Fig. 1—A and Fig. 26). This bar has a plurality of vertical pins 93 between which the ribbons 6 pass in such a way that a 90° twist is given to the ribbons between the bar 92 and the guides 62 already described (see Fig. 2), and after the ribbons pass the bar 92 they pass individually around slightly crowned rollers 94 (see Fig. 27) disposed in a vertical position and located at one end of a graduated curved guide 95 which, at one end, is slightly curved and at the opposite end is curved so that it has substantially a half round cross-section. In passing through this guide, each ribbon is given a curved or cupped form, being curved around its own longitudinal axis. From the left end of the guide 95 (see Fig. 27) each ribbon passes into a corresponding one of the bobbin tubes 91 (see Figs. 41 and 44). These bobbin tubes have a half round cross-section (see Fig. 31—B), with longitudinal slots 96 extending throughout the length of the bobbin tube. Every bobbin tube carries a ribbon curved so as to fit into the cross-section of the bobbin tube as illustrated in Fig. 31—B. As the bobbin tubes move forwardly they pass through openings in the plates 87 and through the openings 19 in the web 3 (see Fig. 44). After the bobbins have completed their forward movement in threading the ribbons through the webs 3, holding mechanism 97 (see Figs. 41 and 31) is brought into action automatically to hold the forward ends of the ribbons when the bobbin tubes 91 withdraw. This mechanism is illustrated in detail in Figs. 31, 31—A and 31—B. It comprises a main sliding frame 98 comprising a pair of parallel slide bars 99 connected by vertical cross bars 100. Each cross bar is passed vertically down between the bobbin tubes 91. The frame 98 operates to hold all the ribbons except the one that is carried in the bobbin tube 101 located at one side of the bank of tubes, and which tube is curved in a direction reverse to the others. Each vertical bar 100 carries a spring-pressed presser foot 102, and these presser feet are carried on two stems 103 (see Fig. 31—A) which pass through the front of the tube and carry coil springs 104. These stems have nuts 105 on their rear ends to limit their forward movement under the action of the springs 104, it being understood that the stems 103 slide freely through the bars 100. When the frame 98 is moved toward the left, it is evident that all the presser feet 102 carried by it will be spring-pressed against the curved inner faces of the ribbons 6, pressing them against back stop strips 91a that extend longitudinally with the path of the tubes 91. Adjacent to these back stop strips 91a, the tubes 91 are formed with slots 91b that enable the presser feet to press the ribbons against the back stop strips 91a and hold the ribbons while the tubes 91 are withdrawn. This frame 98 is actuated by a lever 106. In order to hold the ribbon in the special bobbin tube 101, another frame 107 is provided similar to the frame 98, but having a single bar 108 which carries a spring-pressed presser foot 109.

The back stop strips 91a are relatively thin except the special back stop strip at the left, which is double-faced so as to enable it to cooperate with a spring-pressed foot on each side of it. The special frame 107 is actuated by a lever 110 similar to the lever 106, and these levers are actuated from cams on the shaft of the machine, as will be described hereinafter.

Referring again to Fig. 41, beyond the holding mechanism 97 I provide ribbon severing mechanism 111, which mechanism is illustrated particularly in Figs. 33 to 39 inclusive. This mechanism includes a relatively fixed blade 112 in the form of a plate with half round openings 113 through it, through which the curved ribbons 6 pass. Although this blade 112 is relatively fixed, it does have a slight movement toward the two cutting blades that cooperate with it. This mode of operation is adopted in order to provide clearance for the bobbin tubes. This relatively fixed blade 112 is attached to a shiftable frame 114 (see Fig. 33) which is shifted from its neutral position by means of a lever 115, said lever being actuated at the proper instant by means to be described hereinafter. Cooperating with the sharp cutting edges 116 of the relatively fixed blade 112, I provide a plurality of knives indicated generally by the numeral 117. All of these knives except the one 117a at the left of Fig. 33, are alike. This knife 117a has a slightly different form from the other knives, because it is not necessary for it to provide clearance for any strip back of it. The knives 117 all have deep recesses 118 respectively on their rear sides, and angular projecting edges 119 on their forward sides (see Fig. 36). These projecting cutting edges 119, however, in the position of rest of the knives, are sufficiently withdrawn to permit the bobbin tubes and the ribbon 6 to pass through the openings 113.

These knives 117 are provided with notches 120 on their ends, to enable them to be secured on a reciprocating frame 121. They are spring-pressed against the face of the frame 121 by means of springs 124 on sliding stems 123 that extend through the upper and lower members of the frame 121, so that the end of the stem can engage in a notch in the blade, and are tensioned toward the frame, each spring 124 thrusting against a nut 125 on the end of the stem.

These knives 117 and 117a cut all of the ribbons 6 that face in the same direction, but do not cut the special ribbons 6a shown at the right in Fig. 33. The frame 121 is actuated by a lever 126 at the proper instant to advance toward the right from its position of rest in which it is shown in Fig. 33. At the same instant the plate 112 has a slight movement toward the left through a small space preferably about ⅛" as indicated at the point 127. This movement has been referred to, and enables the relatively fixed plate 112 to take up the clearance between the curved edges 128 of its openings 113, and the curved ribbons 6. This enables the ribbons to be cut off without bending them laterally.

The special ribbon 6a is cut off or severed by a special blade 129 (see Fig. 33) which is carried on a reciprocating frame 130 actuated by a lever 131 by means that will be described hereinafter. As this blade 129 moves toward the left, the relatively fixed plate 112 moves toward the right as indicated at 132, so as to take up clearance at the curved back of the ribbon 6a and meet the projecting cutting point of the blade 129.

It will be evident that the severings of the ribbons, however, do not completely disconnect the completed egg box, but its severing from the webs is completed by means of a web-severing mechanism 133 (see Figs. 4 and 41). This mechanism is in the form of a reciprocating frame including sleeves 134 adapted to reciprocate on fixed guide bars 135 which extend outwardly at the side of the assembling unit, and this mechanism also includes a gang of cutter bars 136, which are preferably pivoted on pins 137 so that they extend parallel with each other, and so that they can be projected through the assembling unit between the vertical guide plates 87 that guide the webs 3 downwardly. The forward end of each cutter bar 136 carries a rotary knife or cutter 138. These cutters are all spring-pressed toward the guide plates 87 so that when they pass over the webs 3 they will sever their lower ends. In the present instance, this spring pressure is maintained by means of a gang of coil springs 139 thrusting against back-up nuts 140 on a threaded bar 141, the forward ends of the springs thrusting against the outer ends of the cutter levers 136. This web-cutting frame 133 is advanced at the proper moment in the cycle of the machine through any suitable means, such as a rack 142 meshing with a segment 143 that is driven from the shafting of the machine, as will be described hereinafter.

Any suitable means may be employed for feeding the webs down through the assembling unit with a step-by-step movement. For this purpose, however, I have illustrated a combined ejector and pulling feeder (see Figs. 4 and 42). This mechanism includes a frame 144 having a cross bar 145 at each side of the machine connected by bars 145a. These bars 145a support cross-bars 153 adjacent the webs 3 respectively. Each of the bars 153 carries a gang of dog bars 152 secured to it, said dog bars each having a dog or tooth 152a at its lower end to project through a corresponding opening 19 in its adjacent web so that when the frame 144 descends, it will pull down the webs through one space and bring the next row of threading openings 19 into alignment with the threading bobbin. These dogs are similar to dogs 147 carried on fixed dog bars 146 (see Fig. 4—a) which have abrupt shoulders 149 on their forward sides, and inclined faces 150 on their upper sides. Hence when the dogs 152a move upwardly they will release themselves from the openings 19. The lower edges of the guide plates 87 for the webs 3 in alignment with the dog bars 146 and 147, have slots 151 cut in them as indicated in Fig. 4—a.

These dog bars 152 have sufficient freedom of movement to enable them to swing outwardly slightly from the guide plates 87 on their up stroke.

As the webs are pulled downwardly, they are held down by the detent dogs 146 somewhat similar to the dog bars 152, but secured at their upper ends to fixed cross bars 146a that pass transversely of the webs. These detent dogs 146 engage in intermediate rows of the openings 19 in the manner indicated in Fig. 4.

The frame 144 includes upright links 154, the lower ends of which are connected by a straightening mechanism 155 (see Fig. 42) the function of which is to straighten the curved ribbons 6 back to their proper vertical plane after they have been threaded through the webs, and after they have been cut off. This mechanism 155 includes a gang of bars 156 and 157 guided to slide longitudinally on each other, and supported at their ends by the lower ends of the links 154. This construction is preferably a bar 158 at each side, and these bars 158 at the proper instant in the cycle of movement, are pulled down by links 159 that are shifted longitudinally. These links are disposed in an inclined direction, and when they slide downwardly through guide blocks 160 (see Fig. 4) they slide in an inclined direction. The bars 156 and 157 have a plurality of downwardly extending fingers 161, which project down between the curved ribbons 6, and which lie between the same when the ribbons are being threaded into position. When the links 159 slide downwardly, these fingers 161 move downwardly in an inclined direction. This enables them to exert pressure on the curved sides of the ribbons 6

6, which straightens them out and presses them over against the vertical edges of the half round openings in the webs. This downward movement of the bars 156 and 157 of the ejecting mechanism, occurs immediately after the ribbons and the webs have been severed, and hence the fingers 161 not only straighten the ribbons into flat form, but also pull the detached filler down below the level of the bobbin. As the return upward movement of the bars 156 and 157 is sudden, the filler falls down into a receiver 162 in the lower part of the assembling unit (see Fig. 4).

Any suitable means may be provided for reciprocating the links 159. In the present instance, this is accomplished by means of actuating links 163, which are pivotally connected at their upper ends to the lower ends of the sliding links 159, and which are connected together by a pivot pin or bar 164 at their lower end. This pin or bar 164 also connects to a vertical link 165 at each side of the machine, and these links 165 are depressed at the proper moment in the cycle of the machine by a lever 166 that supports them, and which is pivotally supported itself on a rocking pin 167, the other end of the lever being actuated by a cam groove 179a in a cam 179. This cam 179 has a cam groove 179b on its other side; that is to say, the near side as viewed in Fig. 4, and this cam groove 179b actuates the actuating arm 171 of the aforesaid segment 143.

It should be understood that the straightening mechanism 155 operates to cause an interlocking between the notches of the ribbons 6 and the edges of the half round openings 19 in the webs, so that after the fillers are detached in succession from the lower ends of the webs, the ribbons will remain in position extending through the webs and form a collapsible filler.

It should also be understood that notches are produced in all of the edges of the ribbons, by reason of the fact that in the slitting operation the slitting knives that slit the ribbon web pass along the longitudinal rows of the punched openings in this web.

The machine is operated so that when the ribbons are severed they will be severed at points indicated by the dotted lines 172 (see Fig 46). These lines 172 pass across the ribbons between the closely placed transverse rows of punched openings. By reason of this, a considerable saving of stock results as this procedure leaves a very small amount of stock carried by the ribbons and projecting beyond the outermost webs that form the filler.

The driving shafting for the machine will now be described, and preferably involves the use of two shafts 173 and 174 (see Fig. 1—A) the former of which extends at right angles to the plane of the web 3 in passing vertically down through the assembling unit, and the latter of which extends parallel with the plane of these webs. The segment 143 is mounted on a rock shaft 174 that also supports a similar segment 143a for engaging the web severing frame 133 on the side remote from that illustrated in Fig. 4. The shaft 174 carries a cam wheel 177 with three cams: one cam 177a actuates lever 106 for the holding mechanism 97; cam 177b actuates cam lever 126 for the ribbon cut-off blades 117 and 117a; cam 177c on the inside of cam 177 actuates segment 99 (see Fig. 1—A) that reciprocates the gang bobbin 92, by connecting to the actuating arm 99a of the segment 99.

The shaft 173 carries two cams 179 and 180. The cam 180 has a cam slot 181 on one face that is engaged by the lever 115 that actuates the relatively fixed shifting blade 112 of the severing mechanism for the ribbons. The other side of this cam has a cam slot 182 that connects with the lever 131 that actuates the special blade 129 that cuts off the special reversely curved ribbon. These cams are shown in Fig. 1—A and Figs. 4, 29 and 30.

The cam 179 actuates the lever 166 that operates the pulling and ejecting mechanism.

A push rod 77 referred to in connection with Fig. 2, is actuated by the actuating arm of the segment 99 (see Fig. 1—A). In order to drive the shafting and other mechanism, a motor 183 is provided (see Fig. 1—A) the shaft of which drives a sprocket chain 184 that drives a sprocket wheel 185 (see Fig. 2). The shaft 186 carrying this sprocket wheel, drives a counter-shaft 187 through a sprocket chain 188, and this counter-shaft through a sprocket chain 189 drives the shaft 174, which shaft is connected by bevel gears 190 to the shaft 173.

From the counter-shaft 187 a sprocket chain 191 extends over and drives one of the shafts 26 of the punch press, and this shaft drives another sprocket chain 192 that extends forward to drive an adjustable drive device 193 (see Fig. 1—A) the driven shaft 194 of which drives the chain or belt 60 that drives the feed roller 59.

The general mode of operation of the machine will now be briefly stated.

Referring to Figs. 1—A and 1—B, the webs 3 are drawn off from the rolls 4 and pass horizontally through the punching unit 1, where the multiple press actuated by the eccentric rods 24 punches the gang of webs 3 with half round threading openings. The webs 3 are advanced with a step-by-step movement through the agency of the feed rolls 23 actuated by the rack 29 (see Fig. 23). The gang of webs from the rolls 4 are punched transversely by punching dies in the punch press that punch half round openings in the same. (See Figs. 11–13). Punches 10 that punch the openings (see Fig. 11) withdraw, and the webs are then advanced so that the holes 19 punched by the punches 10 come into line with the secondary punches 17. After the punches 10 have punched down flaps out of the webs as some of them do, these flaps are brought back into the planes of the webs by spring-pressed pressers, or pressing plates 14. The secondary punches 17 push the attached flaps down so that they project under folding cams 20 (see Figs. 17–20), and as the webs advance, these folding cams fold over the flaps and bend them under the webs, as indicated in Fig. 20.

The ribbon web 5 that is drawn off from the roll 7, if desired, may be guided down through a tension device 57, and thence under a feed roll 58 from which point it passes up and through the lowermost of the punching dies where it is perforated with rectangular openings 40 and notches 42; also notches 43 and 43a to give the round corners when the strips are later slit and then cut off, as indicated in Fig. 6. As this web 5 passes on from the press it is slit by slitting knives 52 (see Fig. 9) into ribbons, which are broken apart at the cross bars 61 (see Fig. 2) from which point the ribbons 6 pass upwardly and thence horizontally to enter the gang bobbin 38, at which point the ribbons are bent into curved form by a guide 95 (see Fig. 27) so that they lie in a curved and collapsed condition within the bobbin tubes 91. The operation of these bobbin tubes will be referred to again hereinafter. However, before they operate, the webs 3 with their half round openings 19, are presented in the assembling unit 2 in parallel planes, and with the eyes 19 in alignment with each other and in alignment with the bobbin tubes 91. The gang bobbin 83 then advances, threading the ribbons through the aligning openings of the webs. At the end of the forward stroke of the gang bobbin, the ribbons are located in a holding device 97 (see Fig. 31 and Fig. 41), which holding device operates to hold the forward ends of the ribbons while the bobbin is withdrawing. After the bobbin is withdrawn, the ribbon severing device shown in Fig. 33, operates to sever all the ribbons, including the reversely curved ribbon 6a; and at about the same time in the cycle of the machine, the web-severing mechanism 133 (see Fig. 41) is actuated so as to move its cutting levers 136 transversely of the webs 3 lying on the vertical guide plates 87, and this cuts off the lower ends of the webs. Soon after this occurs the ribbons which are still in a curved state, are straightened by means of a combined straightener and ejector device (see Fig. 42). This mechanism includes a plurality of finger bars 156 and 157 guided to slide on each other, and having fingers 161 project down between the curved ribbons 6. When the sliding links 159 slide downwardly, they pull these finger bars 156 and 157 downwardly as indicated in the dotted lines in Fig. 42, thereby enabling the fingers 161 to exert pressure against the curved sides of the ribbons, which straightens the ribbon out and causes the notches to interlock with the edges of their openings 19 in the webs. These bars 156 and 157 continue to descend and then suddenly return to their position of rest, thereby causing the completed filler to drop down out of the assembling unit.

As the sliding links 159 slide downwardly, they also actuate the feed bars 145 (see Fig. 4) that carry dog bars 146 carrying the dogs 147 that engage in the openings 19 in the webs and pull them down (see Fig. 4). On the up stroke the webs are held against being pulled upwardly by the detent dogs 152.

The present application is a continuation in part of my allowed application, Serial No. 722,080, filed April 24, 1934, for a Machine for making egg box fillers. Claims 1 to 33 herein cover in general the same subject matter as allowed claims in the said prior application.

It is understood that the embodiment of the invention described herein is only one of the many embodiments this invention may take, and I do not wish to be limited in the practice of the invention, nor in the claims, to the particular embodiment set forth.

What I claim is:

1. In a machine for making egg box fillers, the combination of means for supporting and guiding a perforated web of stock, means for guiding a plurality of ribbons of stock in a direction transverse to the plane in which the said web is guided and in line with the perforations respectively, means for bending the forward end of each ribbon about an axis extending substantially parallel with the direction in which the ribbon extends, means for advancing the ribbons to thread their forward ends through the perforations, and means for flattening out the bent ribbons to lock the same in the perforations.

2. In a machine for making egg box fillers, the combination of means for supporting a plurality of webs of perforated stock, and for guiding the same equidistant from each other and in parallel planes, means for advancing a plurality of ribbons of stock in a direction transverse to the plane in which the webs are guided and in line with the perforations respectively, means for producing interlocking means in the edges of the ribbons, means for threading the forward ends of the ribbons through the perforations and for effecting an interlocking between the said interlocking means and the edges of the perforations, and means for severing the forward ends of the ribbons thereafter.

3. In a machine for making egg box fillers, the combination of means for supporting a plurality of webs of perforated stock and for guiding the same equidistant from each other and in parallel planes, means for advancing a web of stock, means for punching rows of holes in the last named web, means for dividing the last named web along lines extending longitudinally of the web and passing through the said holes to form the same into a plurality of ribbons, the said holes operating to produce notches in the edges of the ribbons, means for bending each ribbon on an axis extending substantially parallel with the longitudinal axis of the ribbon to enable the ribbons to pass through the perforations of the first named webs, and means for threading the ribbons through the said perforations so that the notches in the ribbons become aligned with the edges of the perforations to interlock the ribbons with the first named webs, and means for cutting off the ribbons thereafter.

4. In a machine for making egg box fillers, the combination of means for supporting a plurality of webs of stock and for guiding the same equidistant from each other and in parallel planes, a gang bobbin having a plurality of individual tubular bobbins constructed to carry ribbons of stock extending longitudinally through the same, means for advancing the gang bobbin to pass the ribbons through the said webs, said bobbins operating to hold the ribbons in a transversely cupped condition, and means for flattening the ribbons after the gang bobbin has withdrawn from the webs.

5. In a machine for making egg box fillers, the combination of means for supporting a plurality of webs of stock and for guiding the same equidistant from each other and in parallel planes, a gang bobbin having a plurality of individual tubular bobbins through which the ribbons extend longitudinally from the ribbon supply, and constructed to hold the ribbons in a transversely curved condition and operating to carry the ribbons through the said webs, means for cutting off the length of the ribbons in engagement with the webs, and means for cutting off the ends of the webs to produce the egg box fillers.

6. In a machine for making egg box fillers, the combination of means for supporting a plurality of webs of stock and for guiding the same equidistant from each other and in parallel planes, means for supporting a supply roll for the same, means actuated by a part of the machine for advancing a plurality of notched ribbons and for threading the same in a transversely curved condition through the said webs, means for severing the lengths of ribbon engaging the webs, means for flattening the severed lengths of ribbons to cause the notches to engage with the webs, and means for severing the ends of the webs to produce the egg box filler.

7. In a machine for making egg box fillers, the combination of means for supporting a plurality of webs of stock and for guiding the same equidistant from each other and in parallel planes, means for punching a plurality of openings in the webs, means for supporting a supply roll for supplying ribbons of stock, means actuated by a moving part of the machine for drawing off a plurality of ribbons from the roll and for threading the same in a transversely curved condition through the said openings, means for severing the lengths of ribbon engaging the webs, said ribbons having notches in their edges, means for flattening the severed lengths of ribbons to cause the notches to engage with the edges of the openings of the webs, and means for severing the ends of the webs to produce the egg box filler.

8. In a machine for making egg box fillers, the combination of means for supporting a plurality of sheets of stock substantially equidistant from each other and in parallel planes, means for punching a plurality of openings of substantially semi-circular form in the said webs, means for supporting a supply roll for ribbons, means actuated by a moving part of the machine for drawing off the ribbon stock from the supply roll and for threading ribbons of the stock in a transversely curved condition through the said webs, said ribbons having notches in their edges, means for flattening the curved ribbons to cause their notches to engage with the edges of the openings in the webs, means for cutting off the lengths of ribbon engaging the webs, and means for severing the ends of the webs to produce the egg box filler.

9. In a machine for making egg box fillers, the combination of means for supporting a plurality of webs of stock and for guiding the same equidistant from each other and in parallel planes, means for punching a row of openings in the webs, a reciprocating gang bobbin carrying a row of tubular bobbins corresponding to the openings and guided to reciprocate to and from the said webs to enable the bobbins to pass through the said openings, and means for feeding ribbons of stock longitudinally through the bobbins.

10. In a machine for making egg box fillers, the combination of means for supporting a plurality of webs of stock and for guiding the same equidistant from each other and in parallel planes, means for punching a row of openings in the webs, a reciprocating gang bobbin carrying a row of tubular bobbins corresponding to the openings and guided to reciprocate to and from the said webs to enable the bobbins to pass through the said openings, means for feeding ribbons of stock into the bobbins and lengthwise of the bobbins, said bobbins operating to contain the ribbons, and operating on their forward stroke to carry the ribbons through the said openings, and automatic means for holding the forward ends of the ribbons within the webs when the gang bobbin is executing the return stroke.

11. In a machine of the character described, a reciprocating bobbin in the form of a tube, means for feeding a ribbon longitudinally through the tube, so that the ribbon is contained by the tube, said bobbin tube having a longitudinal slot in the wall thereof, and means for gripping the ribbon at the said slot, at the end of the forward stroke of the bobbin to hold the ribbon in its advanced position during the return stroke of the bobbin.

12. In a machine for making egg box fillers, the combination of means for supporting a plurality of webs of stock and for guiding the same equidistant from each other and in parallel planes, means for punching a row of openings in the webs, a gang bobbin having a plurality of individual bobbins corresponding to the said openings, means for reciprocating the gang bobbin so as to pass the individual bobbins through the openings in the said webs, said individual bobbins each having the form of a tube with a longitudinal slot through one side, means for feeding ribbons of stock through the tubes of the bobbins, a presser frame guided to move transversely of the plane of reciprocation of the bobbins, presser blocks carried by the presser frame opposite the slots of the bobbins for gripping the ribbons to hold the same on the return movement of the bobbins, and means for moving the presser frame in timed relation with respect to the reciprocations of the bobbins to grip the ribbons and hold the same on the return movement of the bobbins.

13. In a machine for making egg box fillers, the combination of a frame, means for supporting a plurality of rolls of paper stock at one end of the frame, means for guiding webs of stock from the rolls with the planes of the webs substantially horizontal, a roller corresponding to each web for guiding the webs downwardly in a substantially vertical plane and substantially parallel with each other, means for punching rows of openings through the webs, means for slitting longitudinally the lowest web to transform the same into a plurality of ribbons corresponding to the said openings, means for threading the ends of said ribbons through the said openings in the webs, means for cutting off the lengths of ribbons lying through the webs, and means for cutting off the ends of the webs to form the egg box fillers.

14. In a machine for making egg box fillers, the combination of a frame, means for supporting a plurality of rolls of paper stock at one end of the frame, means for guiding webs of stock from the rolls through the machine in a substantially vertical plane and substantially parallel with each other, means for punching rows of openings through the webs, means for slitting longitudinally one of the webs off of one of the rolls to transform the same into a plurality of ribbons corresponding to the said openings, means for twisting the ribbons into a vertical plane and for threading the forward ends of the ribbons through the said openings in the webs, means for cutting off the lengths of ribbons lying through the webs, and means for cutting off the ends of the webs to form the egg box fillers.

15. In a machine for making egg box fillers, the combination of a frame, means for supporting a plurality of rolls of paper stock and for guiding webs from the rolls through the machine in a substantially vertical plane and substantially parallel with each other, means for punching rows of openings through the vertical extensions of the webs, means for punching holes in one of the webs and for slitting the same in line with the holes to form a plurality of ribbons with notches in their edges, means for threading the ends of said ribbons through said openings in a condition in which the ribbon is curved around an axis extending longitudinally with the ribbon, means for cutting off the lengths of ribbons lying through the webs, means for flattening the ribbons lying through the openings to cause their notches to engage with the edges of the openings, and means for cutting off the ends of the webs thereafter to form the egg box fillers.

16. In a machine for making egg box fillers, the combination of a frame, means for supporting a web of paper stock, means for punching a plurality of holes disposed in rows on the web extending longitudinally of the web, means for slitting the web in line with the said holes to form a plurality of ribbons with notches in their edges, means for supporting and guiding a plurality of webs of stock equidistant from each other and substantially parallel, said last named webs of stock having aligned openings therein, bobbins guided to move in and out through said openings, and means for feeding the forward ends of the ribbons longitudinally of the bobbins, to enable the bobbins to pull the ribbons forward and thread their forward ends through the aligned openings.

17. In a machine for making egg box fillers, the combination of a frame, means for supporting and advancing a web of paper stock having a plurality of holes disposed in rows extending longitudinally of the web, means for slitting the web in line with the said holes to form a plurality of ribbons with notches in their edges, guide rolls for the ribbons, a plurality of supply rolls for webs of stock, means driven by a part of the machine for drawing the webs from the said supply rolls, and means for guiding the same in a position equidistant from each other and substantially parallel, means for threading the forward ends of the continuous ribbons through the said webs, in a condition in which each ribbon is curved about an axis extending longitudinally of the ribbon, means for severing lengths of the ribbons while lying through the webs, and means for flattening the severed lengths of ribbons lying through the webs to cause the notches in their edges to engage with the webs.

18. In a machine for making egg box fillers, the combination of a frame, a plurality of horizontal parallel feed rollers mounted in the frame, means for guiding a plurality of webs of stock with the planes of the webs horizontal, a horizontal guide roller corresponding to each web for guiding the same vertically downwardly between the feed rollers and equidistant from each other, means for periodically actuating the feed rollers to advance the webs with a step-by-step movement, means for punching openings through the said webs, and means for threading notched ribbons of stock through the openings, means for severing the lengths of ribbons lying through the webs, and means for severing the ends of the webs thereafter to produce the egg box fillers.

19. In a machine for making egg box fillers, the combination of a frame, a plurality of parallel feed rollers mounted in the frame disposed in an upper gang, composed of cooperating pairs of rollers, and a lower gang composed of cooperating pairs of rollers, means for guiding a plurality of webs of stock between the pairs of feed rollers and equidistant from each other, a rack, means for reciprocating the same, pinions carried by certain of the rollers engaging the rack, with ratchets and pawls for rotating the rollers by a movement of the rack in one direction only, means for punching openings through said webs, means for threading notched ribbons of stock through the openings, means for severing the lengths of ribbons lying through the webs, and means for severing the ends of the webs thereafter to produce the egg box fillers.

20. In a machine for making egg box fillers, the combination of a frame, a plurality of parallel feed rollers mounted in the frame, means for guiding a plurality of webs of stock between the feed rollers and equidistant from each other, means for periodically actuating the feed rollers to advance the webs with a step-by-step movement, means for punching openings through the said webs and thereby forming flaps at the openings integral with the webs, means for folding the flaps back against the webs as the webs advance between the feed rollers, means for threading notched ribbons of stock through the openings, means for severing the lengths of ribbons lying through the webs, and means for severing the ends of the webs thereafter to produce the egg box fillers.

21. In a machine for making egg box fillers, the combination of a frame, means on the frame for guiding a plurality of webs of stock substantially equidistant and parallel with each other, means for punching aligning openings in the said webs so as to form flaps integral with the webs, rollers for guiding forward ribbons of stock, means for threading the forward ends of the ribbons of stock from the rollers through the openings to interlock with the edges of the openings, and cooperate with the webs to form substantially square egg compartments into which the said flaps project, means for severing the lengths of ribbons lying through the webs, and means for severing the ends of the webs to produce the egg box fillers.

22. In a machine for making egg box fillers, the combination of means for supporting and guiding a plurality of webs of stock equidistant and substantially parallel to each other, means for holding a plurality of continuous ribbons of stock in a transversely curved condition and for threading the forward ends of the continuous ribbons through the said webs, means for severing the lengths of ribbons while lying threaded through the webs, means for flattening out the ribbons thereafter to cause the same to interlock with the webs, and means for severing the ends of the webs to form the egg box fillers.

23. In a machine for making egg box fillers, the combination of means for supporting and guiding a plurality of webs of stock equidistant and substantially parallel to each other, a plurality of shearing dies, means located in a line with the shearing dies for holding a plurality of notched ribbons of stock in a transversely curved condition and for threading the same through the said webs and past the shearing dies, knives cooperating with the shearing dies, and means for actuating the same to sever the lengths of ribbons while lying threaded through the webs, means for flattening out the ribbons to cause the same to interlock with the webs, and means for severing the ends of the webs to form the egg box fillers.

24. In a machine for making egg box fillers, the combination of means for supporting and guiding a plurality of webs of stock equidistant and substantially parallel to each other, a plurality of shearing dies, means located in line with the shearing dies for holding the forward end of a plurality of continuous ribbons of stock in a transversely curved condition and for threading the same through the said webs while still unsevered, and adjacent to their corresponding shearing dies, a cutter bar guided to move in a plane transverse to the ribbons and carrying cutters corresponding to the different ribbons for engaging the ribbons to cut off the lengths of ribbons while lying threaded through the webs, means for flattening out the ribbons thereafter to cause the same to interlock with the webs, and means for cutting off the ends of the webs to form the egg box fillers.

25. In a machine for making egg box fillers, the combination of means for supporting and guiding a plurality of webs of stock equidistant and substantially parallel to each other, means for advancing paper stock in the form of continuous ribbons with holes punched therein and for holding the said ribbons in a transversely curved condition, and means for threading the forward ends of the continuous ribbons through the said webs with a set of said punched holes located beyond the said webs, and a set of said punched holes located before the webs, a plurality of knives guided to slide transversely of the ribbons and in line with the said punched holes located on the convex side of the curved ribbons and operating to sever the lengths of the ribbons while lying through the webs, means for flattening out the ribbons to cause the same to interlock with the webs, and means for cutting off the ends of webs to form the egg box fillers.

26. In a machine for making egg box fillers, the combination of means for supporting and guiding a plurality of webs of stock equidistant and substantially parallel to each other, means for punching a row of substantially half round openings extending across the webs with the curved sides of all of the openings except one facing in the same direction, and with the remaining opening having its curved side facing in the opposite direction, means for threading a plurality of ribbons of stock having notched edges, in a transversely curved condition through the said openings, means for severing the lengths of the ribbons while lying through the said webs, means for flattening out the lengths of ribbon to cause their notches to engage the edges of the openings, and means for severing the ends of the webs to produce the egg box fillers.

27. In a machine for making egg box fillers, the combination of means for supporting and guiding a plurality of webs of stock equidistant from each other and substantially parallel, a gang bobbin having a plurality of individual bobbins in the form of tubes of substantially half round cross section, means for feeding a plurality of ribbons of stock longitudinally of said tubes and through the same, means for reciprocating the gang bobbin to thread the ribbons through the said webs, means for holding the ribbons within the webs on the return movement of the individual bobbins, means for flattening the lengths of ribbons thereafter to cause their edges to interlock with the webs, means for severing the lengths of ribbon while lying through the webs, and means for severing the ends of the webs thereafter to produce the egg box fillers.

28. In a machine for making egg box fillers, the combination of means for supporting and guiding a plurality of webs of stock substantially equidistant from each other and in parallel planes, means for punching substantially half round openings through the webs and for threading ribbons of stock through the openings in a curved condition, means for severing the lengths of ribbons lying through the webs, bars corresponding respectively to the webs and guided to reciprocate near the plane of each web and having fingers for engaging the curved sides of the ribbons, means for actuating the said bars to cause the fingers to flatten the ribbons and cause their edges to interlock with the edges of the openings.

29. In a machine for making egg box fillers, the combination of means for supporting and guiding a plurality of webs of stock substantially equidistant from each other and in parallel planes, means for punching substantially half round openings through the webs and for threading ribbons of stock through the openings in a curved condition, means for severing the lengths of ribbons lying through the webs, bars corresponding respectively to the webs and guided to reciprocate near the plane of each web and having fingers for engaging the curved sides of the ribbons, means for actuating the said bars to cause the fingers to flatten the ribbons and cause their edges to interlock with the edges of the openings, and means for severing the ends of the webs to produce the egg box fillers.

30. In a machine for making egg box fillers, the combination of means for supporting and guiding forward a plurality of perforated webs of stock with the webs in a substantially vertical plane, substantially horizontal rollers corresponding to the webs over which the webs pass for holding the same spaced apart, means for guiding a plurality of continuous ribbons of stock in a direction transverse to the plane in which the said webs are guided and in line with the perforations respectively, means for bending the forward end of each continuous ribbon about an axis extending substantially parallel with the direction in which the continuous ribbons extend, and means for advancing the continuous ribbons to thread their forward ends through the perforations.

31. In a machine for making egg box fillers, the combination of means for supporting a plurality of webs of stock, means for punching a row of openings in the webs, means for guiding the webs equidistant from each other and in parallel planes, a reciprocating gang bobbin carrying a row of tubular bobbins corresponding to the openings and guided to reciprocate to and from the said webs to enable the bobbins to pass through the said openings, and means for feeding ribbons of stock longitudinally through the bore of the bobbins so that each ribbon assumes a curved form conforming to the curvature of the wall of the bobbin.

32. In a machine for making egg box fillers, the combination of means for supporting a plurality of webs of stock and for guiding the same equidistant from each other and in parallel planes, a reciprocating punch with dies cooperating with the same to perforate all the said webs at one stroke of the punch, means for advancing the webs after the perforations have been formed therein, means for advancing a plurality of ribbons of stock in a plane transverse to the plane of the said webs, and in line with the perforations, means for threading the forward ends of the ribbons through the perforations thereafter, and means for severing the forward portions of the ribbons thereafter.

33. In a machine for making egg box fillers composed of intersecting walls, the combination of means for supporting a plurality of webs of stock and for guiding the same equidistant from each other and in parallel planes, a gang punch with means for actuating the same to punch openings through the webs in succession, a gang bobbin composed of individual bobbins, means for feeding the webs forward after being punched to align the holes with the gang bobbin, means for feeding forward and longitudinally along the axes of the individual bobbins, ribbons of stock of the same width as the wall of the filler to said gang bobbin, and means for actuating the gang bobbin to thread the ribbons through the punched openings in the webs.

34. In a machine for making egg box fillers, the combination of a punch press having a gang of punching dies for punching threading openings through webs, means for guiding a gang of webs of stock through the said press to have openings punched in the same by the said dies, said press having perforating dies for forming perforations in a ribbon web, means for guiding a ribbon web through the said press, means for advancing all the webs through the said press, means for guiding the said first-named webs and for holding the same in substantially parallel relation with the said openings of the different webs aligning with each other, means for slitting the said ribbon web longitudinally in line with the perforations to divide the same into a plurality of ribbons with notches in their edges, means for threading the said ribbons thereafter through the aligning eyes of said gang of webs, and causing the notches to interlock with the edges of the eyes, means for severing the webs thereafter, and means for severing the ribbons thereafter.

35. In a machine for making egg box fillers, the combination of a punch press having a gang of punching dies for punching threading openings through webs, means for guiding a gang of webs of stock through the said press to have openings punched in the same by the said dies, said press having perforating dies for forming perforations in a ribbon web, means for guiding a ribbon web through the said press, means for advancing all the webs through the said press with a step-by-step movement, means for guiding the said first-named webs and for holding the same in substantially parallel relation with the said openings of the different webs aligning with each other, means for slitting the said ribbon web longitudinally in line with the perforations to divide the same into a plurality of ribbons with notches in their edges, means for threading the said ribbons thereafter through the aligning openings of said gang of webs, and causing the notches to interlock with the edges of the eyes, means for severing the webs thereafter, and means for severing the ribbons thereafter.

36. In a machine for making egg box fillers, the combination of a punch press having a gang of punching dies disposed in a substantially vertical arrangement, means for guiding a gang of webs of stock past the said gang of punching dies, said gang of dies including a pair of perforating dies for forming perforations in a ribbon web, means for guiding a "ribbon" web past the perforating dies, means for advancing all of the webs through the said press, means for actuating all of the dies in unison to punch threading openings in the gang of webs and perforations in the "ribbon" web, means for guiding the said gang of webs into a substantially vertical plane and for holding the same in substantially parallel equidistant relation with the openings of the different webs aligning with each other, means for slitting the said "ribbon" web longitudinally in line with the perforations to divide the same into a plurality of ribbons with notches in their edges, means for threading the said ribbons thereafter through the aligning openings of said gang of webs and causing the notches to interlock with the edges of the eyes, and mechanism operating thereafter for severing the webs above the threaded ribbons, and for severing the ribbons, to form the filler.

37. In a machine for making egg box fillers, the combination of a punch press having a gang of punching dies disposed in a substantially vertical arrangement, means for guiding a gang of webs of stock past the said gang of punching dies, said gang of dies including a pair of perforating dies for forming perforations in a ribbon web, means for guiding a "ribbon" web past the perforating dies, means for advancing all of the webs through the said press, means for actuating all of the dies in unison to punch threading openings in the gang of webs and perforations in the "ribbon" web, means for guiding the said gang of webs into a substantially vertical plane and for holding the same in substantially parallel equidistant relation with the openings of the different webs aligning with each other, means for slitting the said "ribbon" web longitudinally in line with the perforations to divide the same into a plurality of ribbons with notches in their edges, means for threading the said ribbons thereafter through the aligning openings of said gang of webs and causing the notches to interlock with the edges of the openings, means for periodically pulling down the ends of the webs after the ribbons have been threaded through the same, and mechanism for severing the webs and the ribbons thereafter.

38. In a machine for making egg box fillers, the combination of a punch press having a gang of punching dies disposed in a substantially vertical arrangement, means for guiding a gang of webs of stock past the said gang of punching dies, said gang of dies including a pair of perforating dies for forming perforations in a ribbon web, means for guiding a "ribbon" web past the perforating dies, means for advancing all of the webs through the said press, means for actuating all of the dies in unison to punch threading openings in the gang of webs and perforations in the "ribbon" web, means for guiding the said gang of webs into a substantially vertical plane and for holding the same in substantially parallel equidistant relation with the openings of the different webs aligning with each other, means for slitting the said "ribbon" web longitudinally in line with the perforations to divide the same into a plurality of ribbons with notches in their edges, means for threading the said ribbons thereafter through the aligning openings of said gang of webs and causing the notches to interlock with the edges of the openings, a combined pulling means and ejector for pulling down the webs with a step-by-step movement, and mechanism for severing the webs and the ribbons thereafter.

39. In a machine for making egg box fillers, the combination of mechanism for punching a gang of webs to form threading openings therein, means for holding the webs substantially equidistant and in substantially parallel planes with the openings aligning, means for threading ribbons through the said openings while the ribbons are bent into a transverse arc about their longitudinal axes, one of the outside ribbons being a special ribbon disposed so that its convex side is disposed toward the convex side of the adjacent ribbon, ribbon cutting mechanism having a relatively fixed cutter blade with openings therethrough curved on one side to maintain the ribbons in their curved form, a gang cutter blade movable longitudinally of said relatively fixed blade having cutting edges to sever all of the ribbons except the said special ribbon, a second relatively movable cutter having a blade for severing the said special ribbon, and means for shifting the said relatively fixed cutter toward the first named cutter when the same is advancing, and toward the second named cutter when the same is advancing.

40. In a machine for making egg box fillers, the combination of a frame, means for guiding a gang of webs down through the frame in a substantially parallel relation and disposed apart, said webs having aligning threading openings, means for threading ribbons through the said openings and for causing the same to interlock with the edges of the openings, pulling means for pulling down the said webs, said pulling means comprising bars for engaging the openings in the web to pull the same down, and detent means for engaging some of the said openings to hold the webs pulled down.

41. In a machine for making egg box fillers constructed as described in claim 40, in which the means for threading the ribbons through the webs, is constructed so as to hold the ribbons in a curved position with respect to the longitudinal axes of the ribbons, means associated with the pulling device for flattening the ribbons thereafter to cause the edges thereof to interlock with the edges of the openings.

42. In a machine for making egg box fillers, the combination of a frame, means for guiding a gang of webs down through the frame in a substantially vertical plane and disposed apart, said webs having aligning openings therein, a substantially horizontal shaft extending in a plane substantially parallel with the planes of said webs, a carriage actuated by said shaft, a gang bobbin mounted on the carriage, means for supplying ribbons of stock to said gang bobbin, said gang bobbin operating to thread the forward ends of the said ribbons through the openings in the webs, a second substantially horizontal shaft extending substantially at right angles to the plane of the webs as they pass down through the frame, a carriage actuated by the second named shaft, means for advancing the webs downwardly with a step-by-step movement, means actuated by the second named carriage for severing the webs after the ribbons have been threaded through the same, and means for severing the ribbons.

43. In a machine for making egg box fillers, the combination of a punch press, means for guiding a gang of webs of stock through the said press to have threading openings punched in the same, said press having a row of punches extending transversely to each web, means for operating the punches to form substantially half round openings in the web and leaving a flap of the material of the web attached on the straight edge of each half round opening, means for pushing the flaps back into the plane of the web after they have been punched from each web, means for advancing the webs after the said punches have perforated the webs and the flaps have been returned to the plane thereof, each die having a second row of punches for starting the flaps out of the planes of the webs thereafter, means for advancing the webs thereafter, and means for engaging the flaps and folding the same against the sides of the webs thereafter.

44. In a machine for making egg box fillers, the combination of a frame, means for guiding a gang of webs through the frame in a substantially parallel relation and disposed apart, said webs having aligning threading openings therethrough, means for threading ribbons through the said openings while the said ribbons are in a transversely curved relation with respect to the longitudinal axes of the ribbons, straightening bars located between the webs and toward the rear with respect to the direction of advance of the webs through the frame, and means for actuating said straightening bars to flatten the ribbons and cause the edges thereof to interlock with the edges of the threading openings.

45. In a machine for making egg box fillers, the combination of a frame, means for guiding a gang of webs through the frame in a substantially parallel relation and disposed apart, said webs having aligning threading openings therethrough, means for threading ribbons through the said openings while the said ribbons are in a transversely curved relation with respect to the longitudinal axes of the ribbons, straightening bars located between the webs and toward the rear with respect to the direction of advance of the webs through the frame, and means for actuating said straightening bars to flatten the ribbons and cause the edges thereof to interlock with the edges of the threading openings, the said actuating means for said straightening bars operating to give the same a lateral movement with respect to the planes of the ribbon.

ROY S. DAVIS.